(12) United States Patent
Hite et al.

(10) Patent No.: US 7,373,355 B2
(45) Date of Patent: May 13, 2008

(54) SYSTEM AND METHOD FOR RELATING APPLICATIONS IN A COMPUTING SYSTEM

(75) Inventors: Thomas D. Hite, Rockwall, TX (US); Shachindra Agarwal, Coppell, TX (US)

(73) Assignee: Metallect Corporation, Plano, TX (US)

( * ) Notice: Subject to any disclaimer, the term of this patent is extended or adjusted under 35 U.S.C. 154(b) by 123 days.

(21) Appl. No.: 10/933,216

(22) Filed: Sep. 3, 2004

(65) Prior Publication Data
US 2006/0053144 A1     Mar. 9, 2006

(51) Int. Cl.
*G06F 7/00* (2006.01)
(52) U.S. Cl. ............................ 707/101; 707/102
(58) Field of Classification Search ............. 707/100, 707/101, 102, 10, 6, 104.1
See application file for complete search history.

(56) References Cited

U.S. PATENT DOCUMENTS

| | | | | |
|---|---|---|---|---|
| 6,986,458 | B2* | 1/2006 | Flugge et al. ............... | 235/375 |
| 2002/0059289 | A1* | 5/2002 | Wenegrat et al. ........... | 707/102 |
| 2003/0018616 | A1* | 1/2003 | Wilbanks et al. ............. | 707/2 |
| 2003/0172368 | A1* | 9/2003 | Alumbaugh et al. ........ | 717/106 |
| 2003/0177112 | A1* | 9/2003 | Gardner ........................ | 707/3 |
| 2004/0034651 | A1* | 2/2004 | Gupta et al. ................. | 707/102 |
| 2004/0093344 | A1* | 5/2004 | Berger et al. ................ | 707/102 |
| 2004/0243595 | A1* | 12/2004 | Cui et al. .................... | 707/100 |
| 2006/0123027 | A1* | 6/2006 | Kohlhammer et al. ...... | 707/101 |
| 2006/0248045 | A1* | 11/2006 | Toledano et al. ............. | 707/2 |
| 2006/0248458 | A1* | 11/2006 | Li ............................... | 715/700 |

OTHER PUBLICATIONS

Klien M., Interpreting XML Documents via an RDF Schema Ontology, Database and Expert Systems Applications, 2002, Proceedings, 13th International Workshop on Sep. 2-6, 2002. pp. 889-893.*
Zuo et al., Web Ontology Language OWL and its Description Logic Foundation, Parallel and Distributed Computing, Applications and Technologies, 2003. PDCAT2003. Proceedings International Conference on, Aug. 27-29, 2003, pp. 157-160.*
McGuinness et al., OWL Web Ontology Language Overview, <http://www.w3.org/TR/2004/REC-owl-features-20040210/>, Feb. 10, 2004, pp. 1-19.*

* cited by examiner

*Primary Examiner*—Greta L Robinson
(74) *Attorney, Agent, or Firm*—Andrews Kurth LLP

(57) ABSTRACT

A system, method, and computer program relate a plurality of applications in a computing system. The system, method, and computer program generate a plurality of ontologies associated with the applications. The system, method, and computer program also generate a meta-ontology associated with the plurality of ontologies. Each ontology includes one or more ontology elements, which represent application components. The application components may include application services and/or parameters for an associated application service. The parameters may include input parameters and output parameters for the associated application service. The meta-ontology includes one or more meta-ontology elements, which represent one or more relationships between at least some of the ontology elements.

29 Claims, 11 Drawing Sheets

SYSTEM AND METHOD FOR RELATING APPLICATIONS IN A COMPUTING SYSTEM

CROSS REFERENCE TO RELATED APPLICATIONS

This patent application is related to:

U.S. patent application Ser. No. 10/133,611 entitled "SERVICE PROVISION SYSTEM AND METHOD" filed on Apr. 25, 2002;

U.S. patent application Ser. No. 10/933,212 entitled "SYSTEM AND METHOD FOR RELATING COMPUTING SYSTEMS" filed on Sep. 3, 2004; and U.S. patent application Ser. No. 10/933,211 entitled "SYSTEM AND METHOD FOR DESCRIBING AN RELATION ONTOLOGY" filed on Sep. 3, 2004;

which are all incorporated by reference.

BACKGROUND

Corporations and other entities typically use computer systems that include a variety of networks, computing platforms, and applications. Example computer systems provide information services to customers or support other computer-related functions. As a particular example, a corporation may support different applications running on different computing platforms to provide services to customers over the Internet. These networks, computing platforms, and applications often operate using different protocols and in different operational environments.

It is typically difficult to integrate the various applications within a computer system. For example, it is often difficult to integrate the applications used by different departments or other subdivisions of a corporation. Typical integration techniques often focus on software developers generating programs to integrate the applications. These integration programs are typically complex and need to be updated over time. Moreover, it is typically difficult to modify the integration programs when circumstances change, such as when an organization adds additional applications to its computer system.

SUMMARY

This disclosure provides a system and method for relating applications in a computing system.

The system, method, and computer program described herein overcome difficulties described above.

In one aspect, a system, method, and computer program relate a plurality of applications in a computing system. The system, method, and computer program generate a plurality of ontologies associated with the applications. "Application," as used herein, may include such components as related services and parameters (e.g., input and output parameters) or may refer to stand-alone services, such as web-services. The system, method, and computer program also generate a meta-ontology associated with the plurality of ontologies. Each ontology includes one or more ontology elements, which represent one or more components of the application including, e.g., input parameters, output parameters, and/or services (e.g., a service, a class method, function call, etc.). The meta-ontology includes one or more meta-ontology elements, which represent one or more relationships between at least some of the ontology elements.

In particular aspects, potential relationships between at least some of the ontology elements are identified, and confidence levels for the potential relationships are identified. A user is allowed to approve of the potential relationships, and the approved potential relationships are added between a meta-ontology element and the two ontology elements of the approved potential relationship.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION OF THE INVENTION

Figure 1:
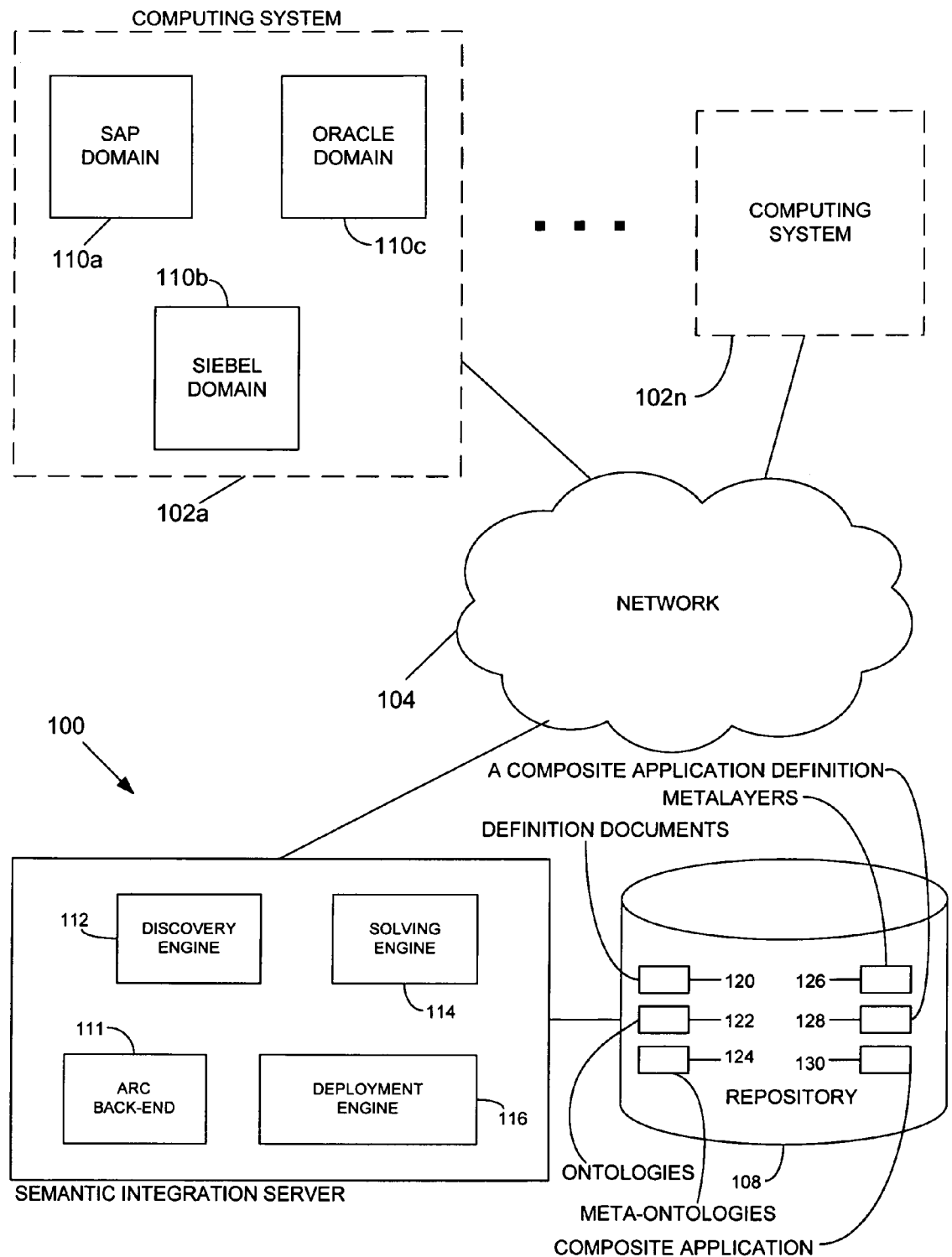
FIG. 1 illustrates an example system for integrating one or more computing systems according to one embodiment of this disclosure.

FIG. 1 illustrates an example system 100 for relating one or more computing systems according to one embodiment of this disclosure. In the illustrated example, the system 100 includes multiple computing systems 102a-102n, a network 104, a semantic integration server 106, and a repository 108. Other embodiments of the system 100 may be used without departing from the scope of this disclosure.

In one aspect of operation, the semantic integration server 106 identifies various applications supported in the computing systems 102a-102n (referred to as "computing systems 102"). The applications may be divided or partitioned into one or more "solution domains." The semantic integration server 106 generates ontologies that uniquely identify and electronically describe the application components (e.g., parameters and computing services (i.e., functions, methods, services, etc.)). The semantic integration server 106 also generates a meta-ontology for each solution domain, where the meta-ontology elements anchor relationships between elements in one or more ontologies. This allows the semantic integration server 106 to identify interaction points between applications in a single solution domain, thereby identifying their ability to interact, and thus how to integrate those applications. In addition, the semantic integration server 106 generates additional metalayers, or meta-meta-ontologies, which allow applications associated with different solution domains to interact, thereby relating these applications. In this way, applications in a single computing system 102 may be more easily integrated, and multiple computing systems 102 may be more easily integrated with one another.

In the illustrated embodiment, each computing system 102 is coupled to the network 104. In this document, the term "couple" and its derivatives refer to any direct or indirect communication between two or more elements, whether or not those elements are in physical contact with one another. Also, in this document, the term "each" refers to each of at least a subset of the identified items. Each computing system 102 represents any suitable system, such as a computing system used and maintained by a corporation or other organization. Each computing system 102 includes any hardware, software, firmware, or combination thereof supporting one or more services. For example, a computing system 102 may include a collection of networks, computing platforms such as servers, and applications executed by the servers. The applications in the computing system 102 may support various services, such as services for providing information to users.

As shown in FIG. 1, a computing system 102 may include applications operating in different environments or domains 110a-110c (referred to as "operating domains 110"). In this example, an application in a computing system 102a may operate in a SAP domain 110a, a Siebel domain 110b, or an Oracle domain 110c. Other or additional types of operating domains 110, such as a Windows New Technology (NT) environment or a Lightweight Directory Access Protocol (LDAP) environment, could also be used in a computing system 102. Also, a computing system 102 could include one or multiple operating domains 110.

The network 104 is coupled to the computing systems 102. The network 104 facilitates communication between components of system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate type of protocol or protocols, such as Ethernet, IP, X.25, frame relay, or any other protocol.

The semantic integration server 106 is coupled to the network 104 and the repository 108. The semantic integration server 106 supports the integration of applications in a single computing system 102 and/or in different computing systems 102. For example, the semantic integration server 106 identifies the applications available in the computing systems 102, generates ontologies that uniquely identify computing services that are components of applications, and generates meta-ontologies for relating elements in the ontologies. The semantic integration server 106 also generates metameta-ontologies for inter-relating the meta-ontologies. In this way, the semantic integration server 106 describes how the applications in one or more computing systems 102 may interact, thereby integrating the computing systems 102. The semantic integration server 106 includes any hardware, software, firmware, or combination thereof for identifying (i.e., discovering) integration points within one or more computing systems. As a particular example, the semantic integration server 106 could include software routines stored in one or more memories and executed by one or more processors.

The repository 108 is coupled to the semantic integration server 106. The repository 108 stores information generated by the semantic integration server 106 that describes the integration points between one or more computing systems 102. The repository 108 includes any hardware, software, firmware, or combination thereof for storing and facilitating retrieval of information. The repository 108 may also use any of a variety of data structures, arrangements, and compilations to store and facilitate retrieval of information. While FIG. 1 illustrates that one repository 108 is coupled directly to the semantic integration server 106, any number of repositories 108 may reside at any location or locations accessible by the semantic integration server 106.

In the illustrated example, the semantic integration server 106 includes an ARC backend 111, a discovery engine 112, a solving engine 114, and a deployment engine 116. This illustrates one example embodiment of the semantic integration server 106. Other embodiments could be used without departing from the scope of this disclosure.

The discovery engine 112 performs service discovery to identify the various services (or functionalities) contained in the applications in the computing systems 102. The discovery engine 112 also generates information used to describe the integration points (application services) within the computing systems 102. For example, the discovery engine 112 may analyze a repository of each application server in one or more computing system 102 and identify the applications, and contained application services, provided by the application servers, where each application supports one or more services. In some embodiments, the discovery engine 112 then generates documents describing the identified services. In particular embodiments, the discovery engine 112 generates service definition documents (SDDs) 120 for the identified services. A service definition document 120 uniquely identifies and describes a service. As a particular example, a service definition document 120 could represent a XML Semantic Integration Standard (XSIS) document describing a service.

The discovery engine 112 uses third-party meta-data, e.g., documentation, source code, and other service description documents (e.g., web services description language (WSDL) documents) to generate ontologies 122. The discovery engine 112 sends this discovered information to the ARC backend 111. The ARC backend 111 generates one or more meta-ontologies 124, each of which is used as an intermediate point (anchor) for relationships between elements in one or more ontologies 122. In addition, the ARC backend 111 generates one or more metalayers or meta meta-ontologies 126 for use in relating one or more meta-ontology entities 124.

In some embodiments, the applications in one or more computing systems 102 are divided into solution domains. Each solution domain is associated with a meta-ontology 124, and the meta-ontology 124 is used to describe the integration points contained in the applications within the solution domain. The metalayer or meta meta-ontology 126 is associated with multiple solution domains and is used to integrate the applications within those solution domains. Collectively, one or more ontologies 122 and a meta-ontology 124 associated with a solution domain is referred to as a "metontology set." The service definition documents 120, ontologies 122, meta-ontologies 124, and metalayers 126 are stored in the repository 108. The discovery engine 112 includes any hardware, software, firmware, or combination thereof for identifying and/or integrating services in one or more computing systems 102.

The solving engine 114 uses the information produced by the discovery engine 112 and the ARC backend 111 to identify how discovered services may be linked together to reach a particular objective. For example, multiple services could be used in series to process particular information to reach a specified goal. As a particular example, the solving engine 114 may identify a sequence of services that may be used to reach a specified goal, where the output of one service is input to another service. In some embodiments, the solving engine 114 receives a request from a user. The request may, for example, identify the inputs to be provided and the objective to be reached. The solving engine 114 then performs algorithms in which the solving engine 114 starts with the objective in the request and attempts to identify how the objective may be solved using the identified services. Using the results of the algorithms, the solving engine 114 generates a composite application definition 128. The composite application definition 128 defines an application that invokes one, some, or all of the identified services to reach the goal specified in the request. The solving engine 114 includes any hardware, software, firmware, or combination thereof for identifying how services may be combined to reach particular objectives.

The deployment engine 116 uses a composite application definition 128 to produce and deploy a composite application 130. The composite application 130 represents an executable application, and when executed the application uses one or more services in the system 100 to reach a particular objective. For example, the deployment engine 116 may perform code generation to create the executable application and run scripts to deploy the executable application. As a particular example, the scripts may be used to distribute the executable application to servers in the computing systems 102 and to update registries in the servers. The deployment engine 116 includes any hardware, software, firmware, or combination thereof for generating and deploying executable applications.

Although FIG. 1 illustrates one example of a system 100 for integrating computing systems 102, various changes may be made to FIG. 1. For example, applications in any number of computing systems 102 may be integrated. Also, the functional division shown in the semantic integration server 106 is for illustration only. Various components in the semantic integration server 106 may be combined or omitted and additional components may be added according to particular needs. As a particular example, the semantic integration server 106 could include only the relation functionality of the discovery engine 112 and the ARC backend 111, where the server 106 processes information about discovered services produced by another component in the system 100. Further, although the description above has described the use of a server 106, other computing devices such as a desktop computer or a laptop computer could be used. In addition, while FIG. 1 illustrates the use of one server 106 and one repository 108, any number of servers or repositories may be used.

Figure 2A:
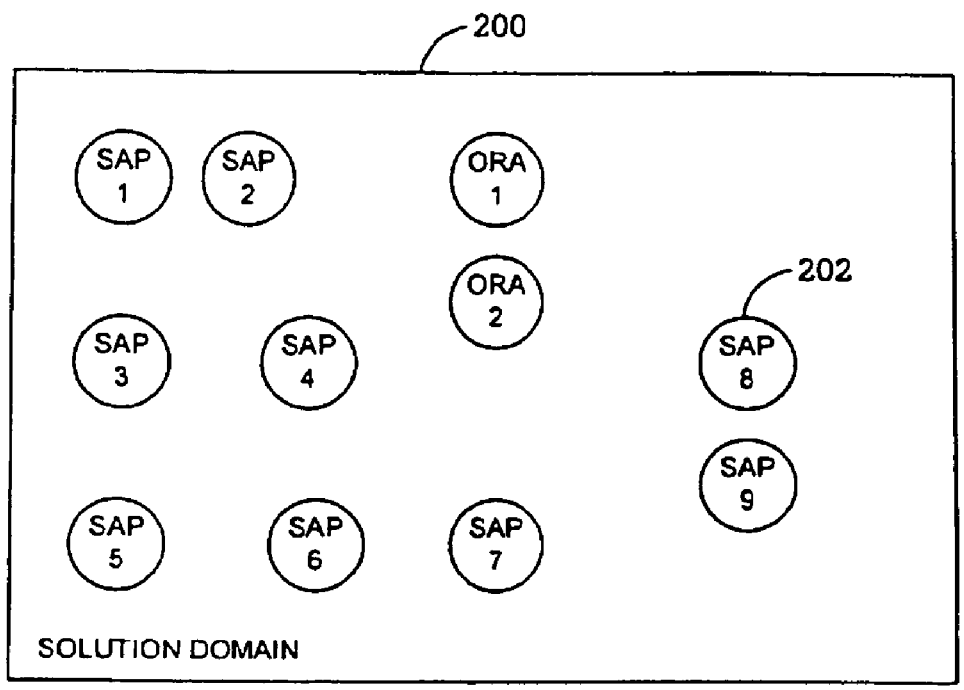
FIGS. 2A through 2C illustrate example solution domains according to one embodiment of this disclosure.
Figure 2B:
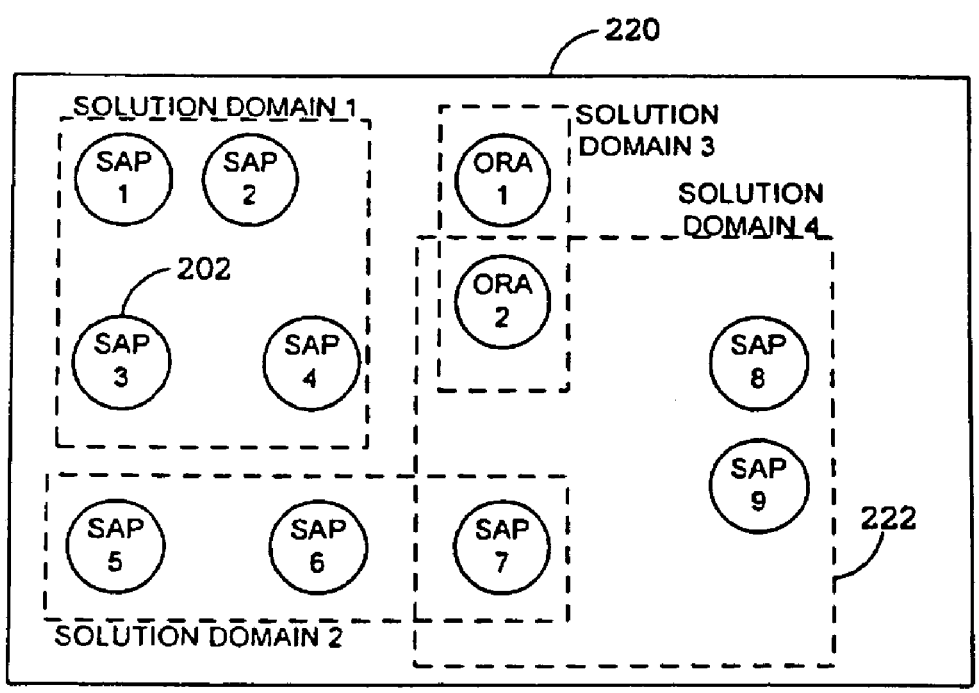
Figure 2C:
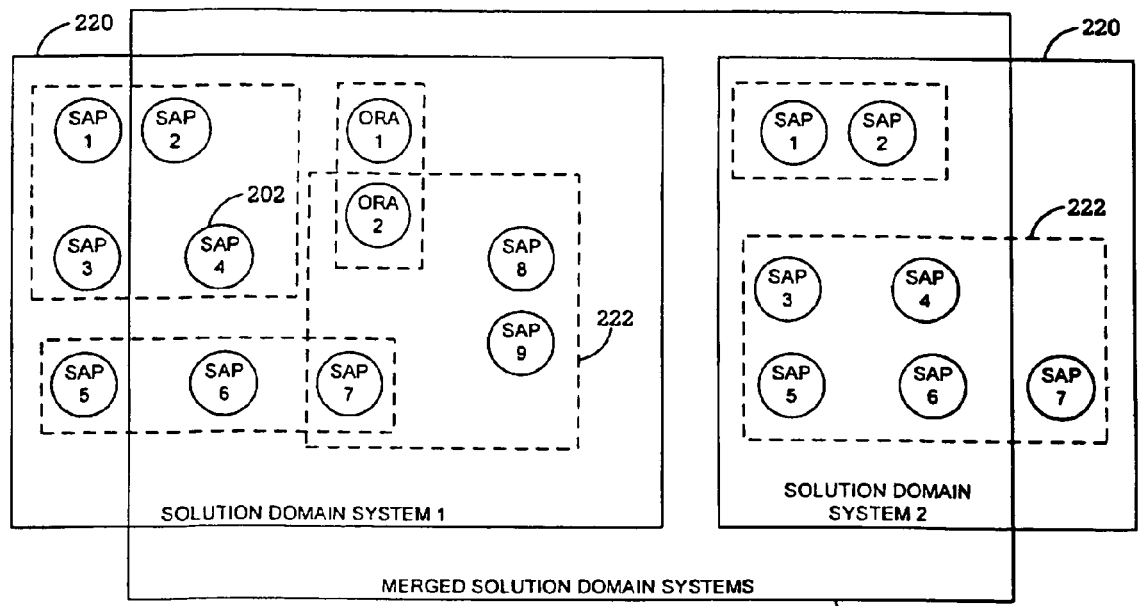

FIGS. 2A through 2C illustrate example solution domains according to one embodiment of this disclosure. The solution domains shown in FIGS. 2A through 2C are for illustration only. Other solution domains may be used without departing from the scope of this disclosure.

In some embodiments, the same application may be installed on one or multiple platforms in one or more computing systems 102, and each installation may be referred to as an "application instance." Application instances supported in one or more computing systems 102 may be divided or partitioned into one or more solution domains. For example, a solution domain may include application instances, ontologies 122, and meta-ontologies 124. In particular embodiments, the server 106 integrates one or more computing systems 102 by integrating the solution domains that are associated with the computing system(s) 102.

In FIG. 2A, a solution domain 200 includes one or more application instances 202 in a single computing system 102. In some embodiments, the application instances 202 represent applications executed in one or more operating domains 110 of the computing system 102. In particular embodiments, the application instances 202 are executed in different operating domains 110 such as SAP and Oracle domains 110. Because the solution domain 200 in FIG. 2A is not divided or partitioned, the solution domain 200 may be referred to as an "un-partitioned solution domain."

In FIG. 2B, another solution domain 220 represents a single computing system 102, and the solution domain 220 has been divided into multiple partitions 222. Each partition 222 includes one or more application instances 202. A solution domain 220 may be divided into partitions 222 using any suitable criteria. For example, the partitions 222 may represent different departments in a corporation or the different statuses (development, testing, beta, production) of software used in the partitions 222. Each partition 222 may represent its own solution domain. Because the solution domain 220 is partitioned, the solution domain 220 may be referred to as a "partitioned solution domain."

In FIG. 2C, portions of two partitioned solution domains 220 have been combined into a super solution domain or a merged solution domain 250. The two partitioned solution domains 220 could, for example, include application instances 202 associated with two different computing systems 102. The merged solution domain 250 represents the portions of the computing systems 102 being integrated.

In one aspect of operation, the server 106 generates an ontology 122 for each application instance 202 in the computing systems 102. The server 106 then generates meta-ontologies 124, which associate elements in the ontologies 122. In some embodiments, an un-partitioned solution domain 200 includes one ontology 122 for each application instance 202 in the solution domain 200 and one meta-ontology 124. The ontologies 122 and the meta-ontology 124 form a 'metontology' set, and the metontology set identifies integration points between the applications in the solution domain 200.

Similarly, each partition 222 in a partitioned solution domain 220 includes one ontology 122 for each application instance 202 in the partition 222 and one meta-ontology 124. For each partition 222, the ontologies 122 and meta-ontology 124 form a metontology set. The solution domain 220 is therefore associated with multiple metontology sets (one for each partition 222). The server 106 generates a meta meta-ontology 126, thus merging the meta-ontologies 124. The metontology sets and the meta meta-ontology 126 identify integration points between the applications in the solution domain 220.

In addition, each un-partitioned solution domain 200 and each partition 222 of a partitioned solution domain 220 in a merged solution domain 250 could be associated with a metontology set. The server 106 generates a meta meta-ontology 126, thus merging the meta-ontologies 124 in the various metontology sets, and the metontology sets and the meta meta-ontology 126 identify integration points between the applications in the merged solution domain 250.

In this way, the server 106 identifies integration points between applications in one or more computing systems 102 by generating one or more ontologies 122, meta-ontologies 124, and meta meta-ontologies 126. The integration of the applications may then be done more quickly and with less effort than in conventional systems.

In the example shown in FIG. 2C, the merged solution domain 250 includes some, but not all, of the application instances 202 in the two partitioned solution domains 220. In particular, the application instances 202 labeled "SAP1", "SAP3", and "SAP5" in the first solution domain 220 and the application instance 202 labeled "SAP7" in the second solution domain 220 are not included in the merged solution domain 250. In this way, the semantic integration server 106 is precluded from being used to integrate portions of a computing system 102 with other computing systems 102 not in the merged solution domain 250.

Although FIGS. 2A through 2C illustrate example solution domains, various changes may be made to FIGS. 2A through 2C. For example, a solution domain may include any number of application instances 202. Also, while FIG. 2C shows that the merged solution domain 250 includes only portions of two solution domains 220, the merged solution domain 250 could include all of either or both solution domains 220. Further, any number of partitions 222 could form a partitioned solution domain 220. In addition, a merged solution domain 250 could include any number of un-partitioned solution domains 200 and/or partitioned solution domains 220.

Figure 3:
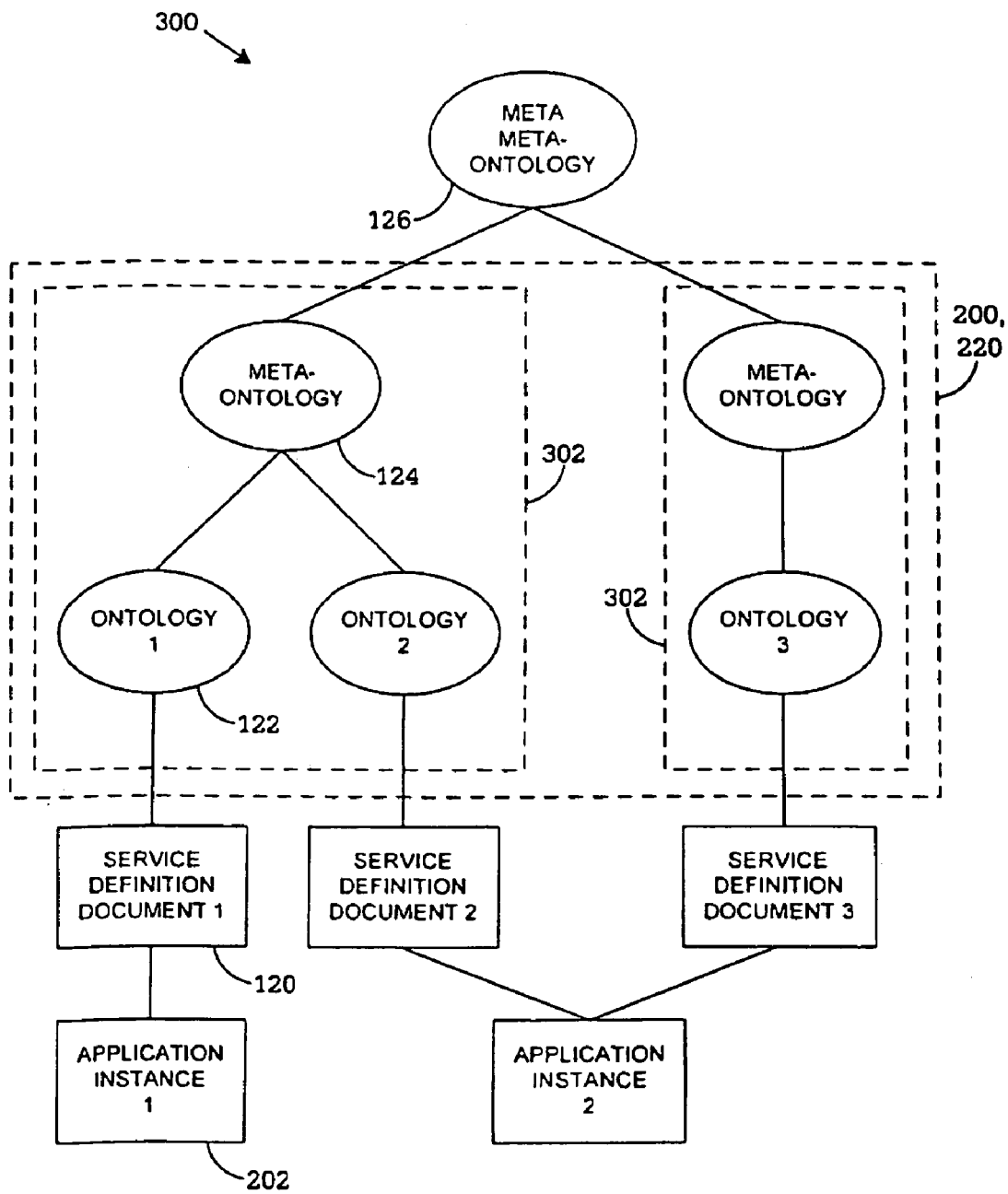
FIG. 3 illustrates an example hierarchy for integrating computing systems according to one embodiment of this disclosure.

FIG. 3 illustrates an example hierarchy 300 for integrating computing systems 102 according to one embodiment of this disclosure. The hierarchy 300 of FIG. 3 is for illustration only. Other hierarchies could be used to identify integration points between computing systems 102 without departing from the scope of this disclosure.

As described above, a service definition document 120 describes a service, which may be provided by an application instance 202 in a computing system 102. In some embodiments, an application instance 202 executed in a computing system 102 represents an enterprise application that supports one or multiple services. Also, each application instance 202 may have an associated application type, which identifies the domain 110 in which the associated application instance 202 resides.

As shown in FIG. 3, each service definition document 120 is associated with an ontology 122. An ontology 122 uniquely identifies the services, and optionally the inputs and outputs of those services that are provided by an application instance 202. For example, a service typically accepts zero or more input parameters and produces one or more output parameters. In some embodiments, each instance of an input or output parameter is represented or described by an element in an ontology 122. In particular embodiments, an ontology 122 is stored as Web Ontology Language (OWL) document, where the document identifies the various input and output parameters of the service. Because an ontology 122 is associated with an application instance 202, the ontology 122 may be referred to as an "application instance ontology" (AIONT).

One or more ontologies 122 are associated with a meta-ontology 124. A meta-ontology 124 identifies the relationships between the elements in one or more ontologies 122. A relationship could be between elements within a single ontology 122 or between elements in different ontologies 122. Collectively, one or more ontologies 122 and the meta-ontology 124 associated with those ontologies 122 form a metontology set 302. In particular embodiments, one metontology set 302 represents a solution domain 200 or a partition 222 of a solution domain 220. The collection of all ontologies 122 and meta-ontologies 124 in all solution domains may be referred to as an "ontology universe."

Because a meta-ontology 124 identifies the relationships between the elements in one or more ontologies 122, the services represented by those ontologies 122 may interact. This may help to integrate an un-partitioned solution domain 200 or a partition 222 of a partitioned solution domain 220.

In addition, the meta-ontologies 124 may be merged or combined via a meta meta-ontology or metalayer 126. This allows relationships to be identified between elements in ontologies 122 that are associated with different solution domains or different solution domain partitions. Because a meta meta-ontology 126 is used to relate ontologies 122 in different solution domains or partitions, the services in the different solution domains or partitions may be suggested to interact. This may help to integrate a partitioned solution domain 220 or to integrate a merged solution domain 250 involving multiple solution domains 200, 220.

Although FIG. 3 illustrates one example of a hierarchy 300 for inter-relating computing systems 102, various changes may be made to FIG. 3. For example, each application instance 202 may be associated with any number of service definition documents 120, and each meta-ontology 124 may be associated with any number of ontologies 122. Also, each metalayer 126 may be associated with any number of metontology sets 302.

Figure 4:
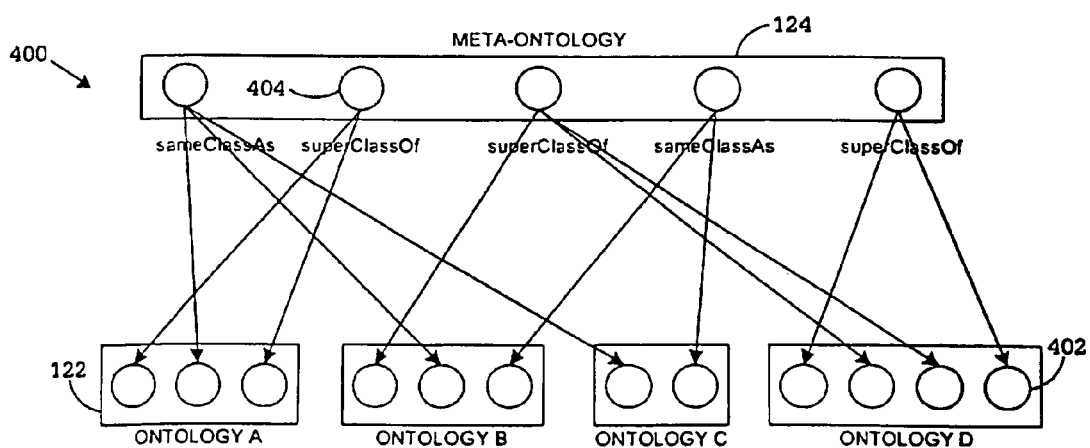
FIG. 4 illustrates an example metontology set according to one embodiment of this disclosure.

FIG. 4 illustrates an example metontology set 400 according to one embodiment of this disclosure. The metontology set 400 shown in FIG. 4 is for illustration only. Other metontology sets may be used in the system 100 of FIG. 1 without departing from the scope of this disclosure.

In the illustrated example, the metontology set 400 includes a meta-ontology 124 and multiple ontologies 122. Each ontology 122 includes one or more ontology elements 402, and the meta-ontology 124 includes one or more meta-ontology elements 404. The ontologies 122 and the meta-ontology 124 could, for example, represent or be associated with a single solution domain, such as an un-partitioned solution domain 200 in FIG. 2A or a partition 222 of a partitioned solution domain 220 in FIG. 2B.

As described above, each ontology 122 is associated with one or more services in a computing system 102. A service typically accepts zero or more input parameters and produces one or more output parameters. Each instance of an input or output parameter is represented by an element 402 in the associated ontology 122. In some embodiments, an input or output parameter is associated with a class, so an ontology element 402 representing that parameter is also associated with a class. A class could represent a primitive class (such as strings, integers, or floating-point numbers), a complex class (a combination of primitive or complex classes), or an array (a list of primitive or complex items). Each instance of an input or output parameter also typically has an instance or parameter name.

The collection of ontology elements 402 associated with the service(s) provided by an application instance 202 forms an ontology 122. The ontology 122 is associated with an application type identifying the domain 110 in which the application is contained (such as SAP, Siebel, or Oracle) and an application instance name. The ontology 122 also maintains the aggregate relationships between the ontology elements 402. In particular embodiments, an ontology 122 is defined in an OWL document, and the OWL document describes the ontology elements 402 and the aggregate relationships between those elements 402.

Two or more ontology elements 402 in the ontologies 122 may be related to one another in different ways. In some embodiments, ontology elements 402 may be related through an identical relationship or a transformational relationship. For an identical relationship, ontology elements 402 represent the same information concepts, and the identical ontology elements 402 may be interchanged without side effects. As a particular example, one ontology element 402 named CustomerNo and another ontology element 402 named CustNum could represent the same concept (a customer number), so these ontology elements 402 are identical.

For a transformational relationship, one ontology element 402 may be converted or transformed into another ontology element 402 by a transform function. As a particular example, one ontology element 402 named CustomerFullName could be transformed into another ontology element 402 named CustomerFirstName by extracting a customer's first name from the customer's full name. In some embodiments, ontology elements 402 may be transformationally related even when multiple transformations performed in series or in parallel are needed to convert one ontology element 402 into another ontology element 402.

As shown in FIG. 4, the meta-ontology 124 identifies the relationships between the ontology elements 402 in the ontologies 122. In particular, the meta-ontology elements 404 in the meta-ontology 124 identify the relationships between the ontology elements 402. For example, an element 404 in the meta-ontology 124 could indicate that two ontology elements 402 are related through identical or transformational relationships. Related ontology elements 402 could reside in the same ontology 122 or in different ontologies 122.

In particular embodiments, OWL is used to describe the ontologies 122 and the meta-ontology 124. However, conventional OWL lacks the ability to completely describe a meta-ontology 124. This disclosure provides an extension to OWL that allows OWL to be used to describe a meta-ontology 124. In particular embodiments, only the extensions are contained in the OWL document describing a meta-ontology 124.

The extension to OWL allows the elements 404 in the meta-ontology 124 to identify the type of relationships between ontology elements 402. For ontology elements 402 that are identical, the meta-ontology 124 uses a sameClassAs relationship statement. In this case, the meta-ontology 124 includes an element 404 that represents the same class as the identical ontology elements 402. For ontology elements 402 that are transformationally related, the meta-ontology 124 uses a superClassOf relationship statement, which represents an extension to standard OWL. In this case, the meta-ontology 124 includes an element 404 that is a super-class of the related ontology elements 402.

By extending standard OWL to allow the use of super-classes, the meta-ontology 124 may be created on demand. For example, the superClassOf extension allows the dynamic creation of the elements 404 in the meta-ontology 124. As a particular example, the meta-ontology 124 could be created or updated dynamically when a user specifies integration points between two or more computing systems 102. In particular embodiments, the superClassOf relationship statement is used exclusively by elements 404 in the meta-ontology 124.

In some embodiments, the elements 402, 404 shown in FIG. 4 are generated during a discovery process performed by the discovery engine 112. The discovery process allows the server 106 to declare the ontology elements 402 within an ontology 122 and then assert relationships between the ontology elements 402. In particular embodiments, the discovery process includes the discovery engine 112 identifying one or more services associated with an application instance 202 and creating a new OWL document associated with the application instance 202. The new OWL document specifies a portion of an ontology 122. The discovery engine 112 also identifies instances of input and output parameters for each service and creates ontology elements 402 within the OWL document. The information contained in the OWL document is stored in the repository 108. The ARC backend 111 further identifies relationships between the ontology elements 402 within the new ontology 122 and between ontologies 122. These relationships are stored in another OWL document, which represents a meta-ontology 124.

As described above, an ontology element 402 can be associated with an instance of an input or output parameter, and the input or output parameter has an associated parameter name and class. Each ontology element 402 has an associated ontology element name and an associated class. As part of the discovery process, the discovery engine 112 generates ontology element names for the ontology elements 402 and stores the names in the OWL documents representing the ontology 122. In some embodiments, the ontology element name of an ontology element 402 represents a combination of (1) the name of an application instance 202 associated with the ontology element 402, (2) the name of the class associated with the ontology element 402, and (3) the name of the input or output parameter associated with the ontology element 402. In particular embodiments, an ontology element name has a format of:

<Application Instance Name>:<Ontology Class Name>:<Parameter Instance Name> where the application instance name is specified by a user and the parameter instance name is specified by a service definition document 120.

The ontology class name may be produced in any suitable manner. As described above, an ontology element 402 is associated with a service provided by an application instance 202. The ontology class name may be generated using information such as the type of application instance 202 (e.g., SAP, Siebel, Oracle), a module name in the application instance 202, a version number of the application instance 202, a data type associated with the ontology element 402, and/or a name space uniform resource identifier (URI) for the data type.

In some embodiments, the module names, version numbers, and name space URIs may not be available in all cases and are therefore optional. Regarding the name space URIs, the service definition documents 120 often use name space identifiers (the URIs) to qualify the data types of input or output parameters. To avoid conflicts between data types specified in different service definition documents 120, the URIs may be used in the ontology class name. Because name space URIs may be long, a name space (NS) prefix that uniquely identifies the name space URI could be used in the ontology class name. In particular embodiments, the ontology class name has the following format:

<Application Type>.<Module Name>.<Version>.<NS Prefix>~<Data Type> where the name space prefix and the data type form a qualified data type.

In some embodiments, the qualified data type is produced differently depending on which type of class (primitive, complex, array) is associated with an ontology element 402. For primitive data types, the qualified data type may be obtained by concatenating the name space prefix and the data type. This may produce qualified data types such as "xsd~string" and "s0~int".

For complex data types, the qualified data type may be obtained using the data type specified in the service definition document 120. For each element in the complex data type, the qualified data type for that element may be obtained by concatenating the qualified data type for the complex data type and the qualified data type for the element. For example, the qualified data type for a complex data type could include "sapns~BAPIKNA101", and an element in the complex data type could include "sapns~BAPIKAN101.xsd~string".

For array data types, the qualified data type is obtained by adding the "[]" suffix to the qualified data type of the primitive or complex class forming the array. As an example, the qualified data type for a complex data type could be "sapns~BAPI_VIEW", and the qualified data type for an array of the complex data type is "sapns~BAPI_VIEW[]".

Although FIG. 4 illustrates one example of a metontology set 400, various changes may be made to FIG. 4. For example, each ontology 122 could include any number of ontology elements 402, and a meta-ontology 124 could include any number of meta-ontology elements 404.

Figure 5:
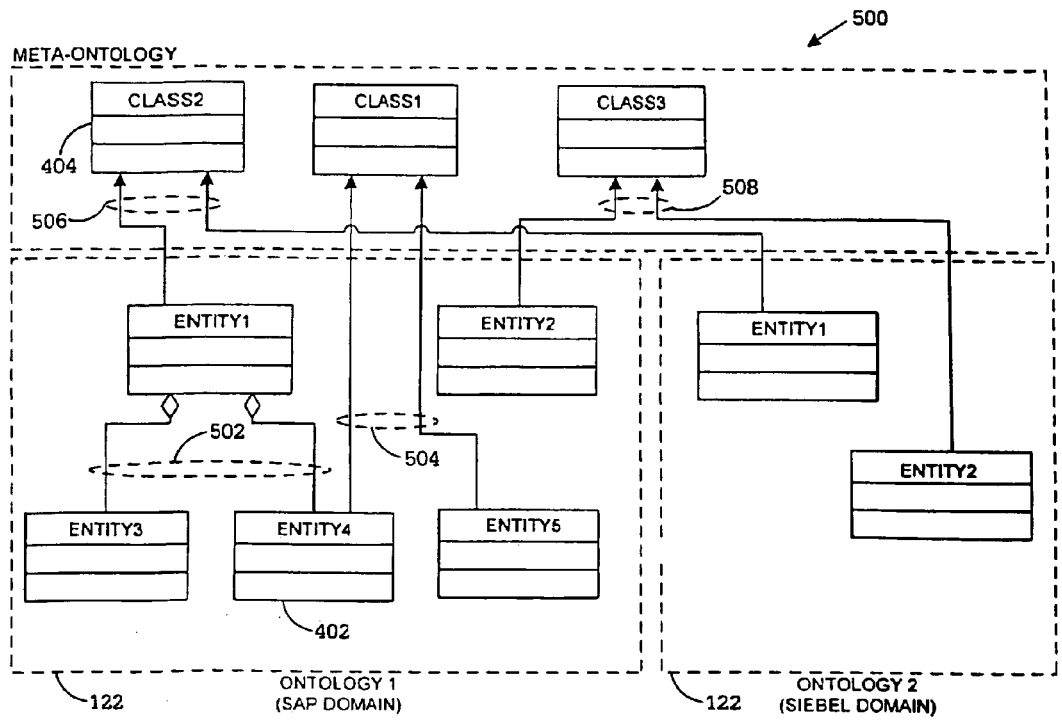
FIG. 5 illustrates an example generation of a metontology set according to one embodiment of this disclosure.

FIG. 5 illustrates an example generation of a metontology set 500 according to one embodiment of this disclosure. In particular, FIG. 5 illustrates a technique used by the discovery engine 112 and the ARC backend 111 to generate ontologies 122 and a meta-ontology 124. The generation of the metontology set 500 shown in FIG. 5 is for illustration only. Other techniques for generating a metontology set 500 may be used without departing from the scope of this disclosure.

In this example, the discovery engine 112 reads service definition documents 120 associated with services provided by application instances 202 in the system 100. The discovery engine 112 builds an ontology 122 for each application instance 202 identified. Each ontology 122 includes one or more ontology elements 402, which represent the instances of input or output parameters for services supported by the application instance 202.

When generating an ontology 122, the discovery engine 112 may identify aggregate relationships between any of the ontology elements 402. In this example, the discovery engine 112 identifies aggregate relationships 502. The aggregate relationships 502 identify ontology elements 402 that form part of other ontology elements 402. In the illustrated example, two ontology elements 402 labeled "Entity3" and "Entity4" in the first ontology 122 form another ontology element 402 labeled "Entity1".

The discovery engine 112 also identifies related ontology elements 402 (identical or transformational relationships) within a single ontology 122. As described above, each input or output parameter is associated with a class, so each ontology element 402 can also associated with a class. In some embodiments, the discovery engine 112 identifies related ontology elements 402 using the classes associated with the ontology elements 402.

When related classes are identified, the discovery engine 112 simply makes ARC backend 111 aware of this information. The ARC backend 111 creates a meta-ontology element 404 in the meta-ontology 124 for the related ontology elements 402. In particular embodiments, the new meta-ontology element 404 represents either a super-class for ontology elements 402 related through a transformational relationship or the same class for ontology elements 402 related through an identical relationship. In this example, the discovery engine 112 identifies transformational relationships 504, which indicate that the ontology elements 402 labeled "Entity4" and "Entity5" in the first ontology 122 have transformationally-related classes. These related classes are associated with a single element 404 in the meta-ontology 124, which represents a super-class for the related ontology elements 402.

The discovery engine 112 further identifies related ontology elements 402 across multiple ontologies 122. For each set of related ontology elements 402, the ARC backend 111 associates the related ontology elements 402 with a meta-ontology element 404 in the meta-ontology 124. In this example, transformational relationships 506 indicate that the ontology elements 402 labeled "Entity1" in both ontologies 122 are transforms of one another. The ARC backend 111 generates a new meta-ontology element 404 labeled "Class2", which represents a super-class associated with the related ontology elements 402. Similarly, identical relationships 508 indicate that the ontology elements 402 labeled "Entity2" in both ontologies 122 are identical. The ARC backend 111 generates a new meta-ontology element 404 labeled "Class3", which is of the same class as the identical ontology elements 402.

In addition, the ARC backend 111 analyzes the meta-ontology elements 404 and identifies the elements 404 associated with transformationally-related ontology elements 402 (as opposed to elements 404 associated with identical ontology elements 402). In this example, the elements 404 labeled "Class1" and "Class2" are associated with transformationally-related ontology elements 402, whereas "Class3" is associated with identical ontology elements 402.

As described above, the transformationally-related ontology elements 402 represent transformations of each other. For the transformationally-related ontology elements 402, the discovery engine 112 attempts to identify a transform function capable of transforming one of the ontology elements 402 into the other ontology elements 402. This may include the discovery engine 112 automatically identifying the transform function or a user manually identifying the function. If a transform function is identified, the discovery engine 112 generates a service definition document 120 for a transform service. In this way, the discovery engine 112 ensures that transformationally-related ontology elements 402 can be transformed into one another using services in the computing systems 102. This helps to facilitate the integration of one or more computing systems 102.

The related ontology elements 402 in the ontologies 122 may be identified in any suitable manner. In some embodiments, the ARC backend 111 uses rules to identify the related ontology elements 402. For example, a rule could specify that two ontology elements 402 within the same ontology 122 are identical if they are associated with the same complex class. As another example, a rule could specify that ontology elements 402 associated with the string primitive class and having an instance name of Customer-Number or CustNum within a SAP domain 110 are identical. In addition, the rules may dictate exceptions. As an example, a rule could specify that an ontology element 402 named CustomerNumber in a SAP domain 110 of a first computing system 102 is different from ontology elements 402 named CustomerNumber in other computing systems 102. These represent example rules that could be used. Any other or additional rules or types of rules having any complexity could be used.

In some embodiments, the rules may not always be able to determine the relationship or the lack of a relationship between ontology elements 402 accurately. In these embodiments, the rules could identify potential relationships between ontology elements 402, and a user then approves or disapproves of the potential relationships. In particular embodiments, once a relationship is approved, ARC backend 111 may permanently store the relationship in the meta-ontology 124. Because the discovery process may occur a limited number of times (such as once), this may limit the need for a user to repeatedly approve the potential relationships.

The discovery engine 112 could also perform a rediscovery process, which detects changes in the existing services or the presence of new services in one or more computing systems 102. The input or output parameters for new services are often associated with existing classes. If an instance of a parameter has a different name than in previous services, a new ontology element 402 may be generated. Also, the new service may introduce one or more new classes associated with one or more parameters, which also leads to the generation of one or more new ontology elements 402.

As described above, the relationships between ontology elements 402 are stored in the meta-ontology 124 during the discovery process. As a result, many if not all of the relationships may be automatically restored during the rediscovery process. Relationships for any new ontology elements 402 are identified during the rediscovery process, which may be done using the same technique used during the discovery process (rules to identify potential relationships, user confirmation of potential relationships).

In some embodiments, during the rediscovery process, the rules could identify the same or similar potential relationships identified during the discovery process. To simplify the user's interactions, the ARC backend 111 could use the user's prior approvals or disapprovals to automatically approve or disapprove of the potential relationships identified during the rediscovery process.

Although FIG. 5 illustrates one example of the generation of a metontology set 500, various changes may be made to FIG. 5. For example, any number of ontologies 122 with any number of ontology elements 402 could be used. Also, any number of meta-ontology elements 404 in the meta-ontology 124 could be used. Further, the relationships 502-508 between the ontology elements 402 are for illustration only. In addition, each meta-ontology element 404 in the meta-ontology 124 may be associated with any number of ontology elements 402 in one or more ontologies 122.

Figure 6:
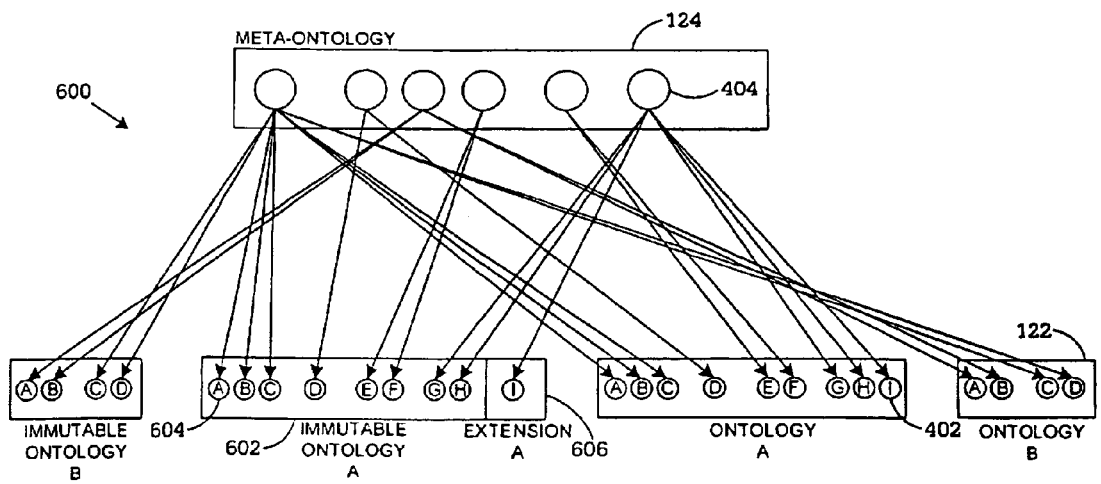
FIG. 6 illustrates another example metontology set according to one embodiment of this disclosure.

FIG. 6 illustrates another example metontology set 600 according to one embodiment of this disclosure. The metontology set 600 shown in FIG. 6 is for illustration only. Other metontology sets may be used in the system 100 of FIG. 1 without departing from the scope of this disclosure.

As described above, the meta-ontology elements 404 in the meta-ontology 124 are used to identify relationships between the ontology elements 402 in the ontologies 122. Ideally, the relationships between ontology elements 402 in one ontology 122 would be the same as the relationships between identical ontology elements 402 in another ontology 122 of the same type. For example, if two ontology elements 402 called "ele1" and "ele2" in one ontology 122 are identical, two ontology elements 402 called "ele1" and "ele2" in another ontology 122 would ideally be identical. This would allow relationships across the ontologies 122 to be identified. As an example, if the ontology elements 402 called "ele1" is and "ele2" were identical in each ontology 122, "ele1" in one ontology 122 ideally would be identical to "ele2" in the other ontology 122.

This ideal behavior does not always occur. For example, the relationships between ontology elements 402 in one ontology 122 may be different from the relationships in another ontology 122. This may occur when two ontology elements 402 in one ontology 122 are identical, while two ontology elements 402 in another ontology 122 are transformationally related. Moreover, there may be ontology elements 402 in one ontology 122 that do not exist in another ontology 122. As a result, it may be difficult to identify relationships between ontology elements 402 in different ontologies 122. This may become even more difficult when relationships from two or more solution domains are merged.

As shown in FIG. 6, to facilitate the identification of relationships across ontologies 122, an immutable ontology 602 is associated with each ontology 122. In some embodiments, an immutable ontology 602 represents an ontology that cannot be modified once created. Also, in some embodiments, an immutable ontology 602 includes one or more immutable ontology elements 604, and any relationships involving the immutable ontology elements 604 also cannot be modified once created.

In some embodiments, rather than modifying an immutable ontology 602, the immutable ontology 602 can be extended. For example, when an ontology 122 is added to a solution domain, an immutable ontology 602 is created. The ontology elements 402 in the new ontology 122 are then mapped or related to the ontology elements 604 in the new immutable ontology 602. If a new ontology element 402 is later introduced in the ontology 122, a new element 604 is added to the immutable ontology 602. The new element 604 is tagged as an extended element and placed in an extension 606 of the immutable ontology 602. In this way, although the immutable ontology 602 cannot be changed, the immutable ontology 602 may be updated as needed.

In the example shown in FIG. 6, the ontology elements 402 labeled "A" through "H" form part of the ontology 122 labeled "Ontology A" and can be mapped to the elements 604 of the immutable ontology 602 labeled "Immutable Ontology A." After this immutable ontology 602 is generated, an ontology element 402 labeled "I" is added to the ontology 122 labeled "Ontology A". Because the immutable ontology 602 cannot be altered, an element 604 labeled "I" is added in the extension 606 of the immutable ontology 602. This allows the ARC backend 111 to update the immutable ontology 602 as its associated ontology 122 is modified.

As explained below with respect to FIGS. 7A and 7B, immutable ontologies 602 are useful in merging solution domains. In particular, the immutable ontologies 602 may be used to identify relationships between ontology elements 402 in different solution domains.

Although FIG. 6 illustrates another example of a metontology set 600, various changes may be made to FIG. 6. For example, each immutable ontology 602 could include any number of elements 604. Also, each immutable ontology 602 may or may not include an extension 606 having any suitable number of elements 604.

Figure 7A:
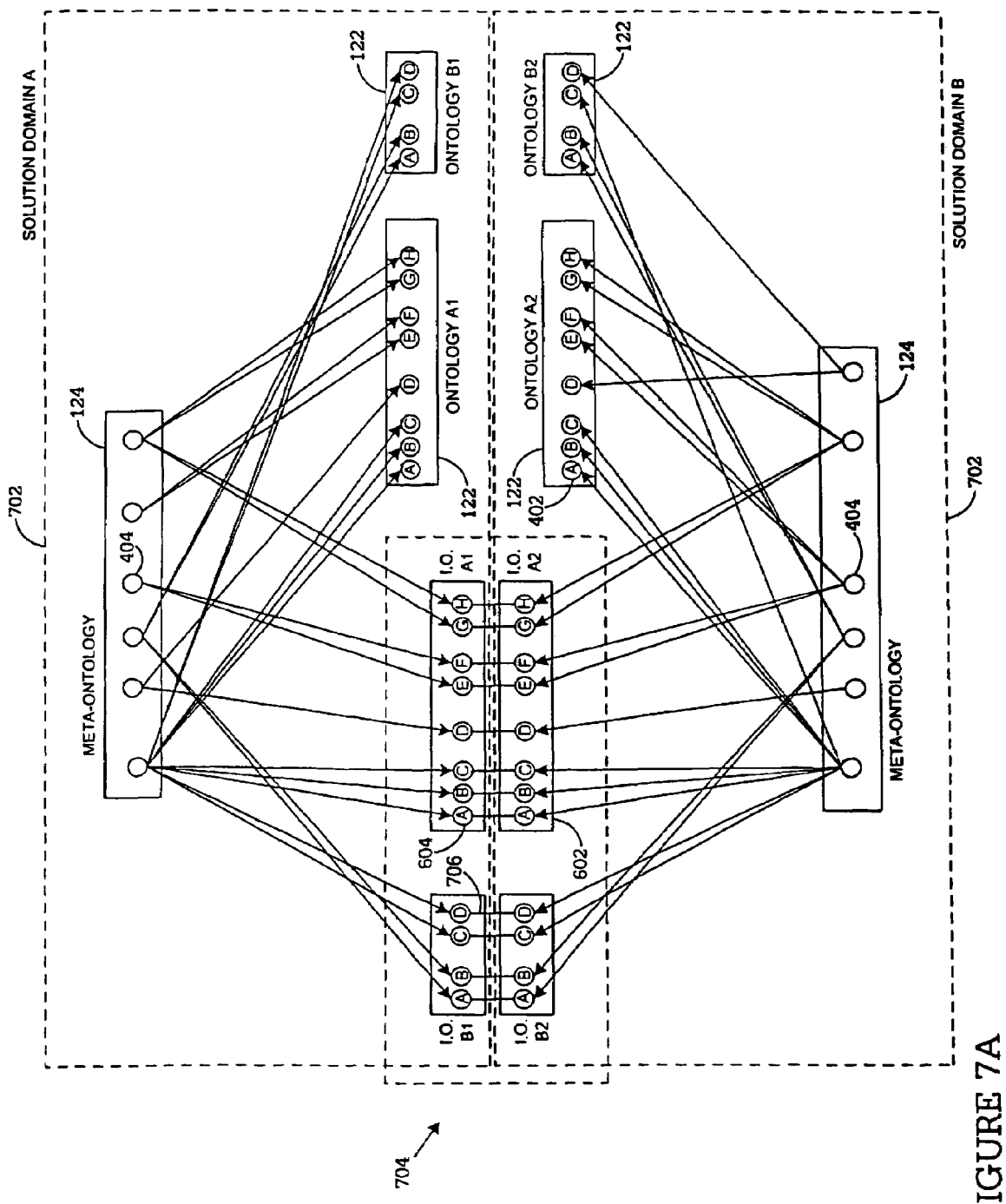
FIGS. 7A and 7B illustrate an example relationship between two solution domains according to one embodiment of this disclosure.
Figure 7B:
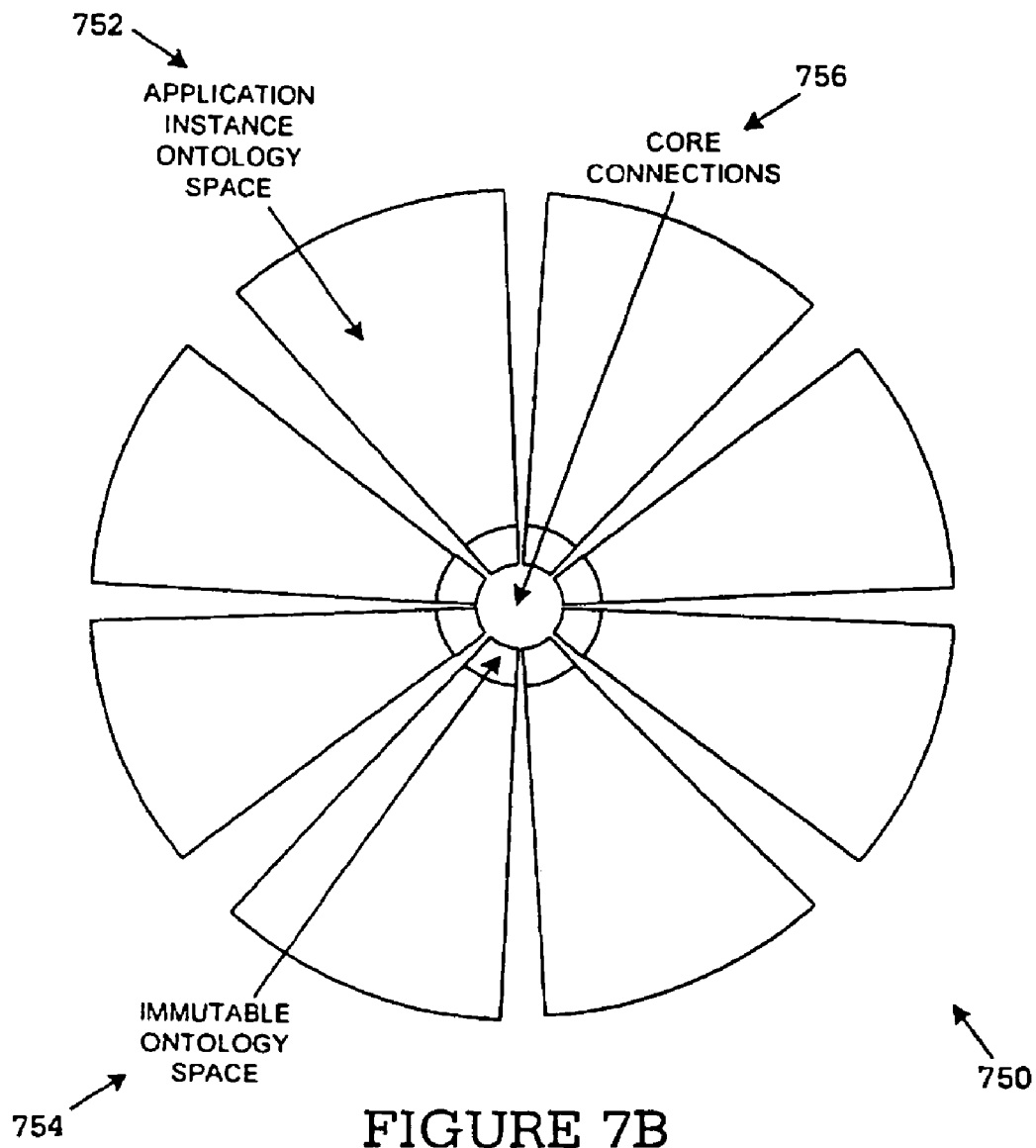

FIGS. 7A and 7B illustrate an example relation of two solution domains 702 according to one embodiment of this disclosure. In particular, FIGS. 7A and 7B illustrate the inter-relationships between two solution domains 702 using immutable ontologies 602 having no extensions 606. The relationship shown in FIGS. 7A and 7B is for illustration only. Other solution domains may be related without departing from the scope of this disclosure.

As shown in FIG. 7A, each solution domain 702 includes two ontologies 122, a meta-ontology 124, and two immutable ontologies (I.O.) 602. A merged solution domain 704 may be created that includes at least part of the two solution domains 702. To facilitate the identification of relationships between ontology elements 402 in different solution domains 702, the immutable ontologies 602 are used.

In the illustrated example, an element 604 in an immutable ontology 602 is associated with an ontology element 402 in one of the solution domains 702. Elements 604 in immutable ontologies 602 in different solution domains 702 can also be associated through a connection 706. In effect, this connection 706 combines or collapses the two immutable ontology elements 604 into a single immutable ontology element 604. If all elements 604 in two immutable ontologies 602 are connected, this collapses the two immutable ontologies 602 into a single immutable ontology 602.

Relationships between ontology elements 402 in different solution domains 702 can be identified using the connections 706. In particular, the server 106 may navigate from one ontology element 402 in one solution domain 702 to another ontology element 402 in another solution domain 702 through the elements 604 in the immutable ontologies 602. This allows the relationships between ontology elements 402 in different solution domains 702 to be automatically generated. As an example, an element 404 in the meta-ontology 124 of the top solution domain 702 relates the ontology element 402 labeled "H" and the immutable ontology element 604 labeled "H". Similarly, an element 404 in the meta-ontology 124 of the bottom solution domain 702 also relates an ontology element 402 labeled "H" and an immutable ontology element 604 labeled "H". A connection 706 links the two immutable ontology elements 604 labeled "H". As a result, the two ontology elements 402 labeled "H" are related through the immutable ontology elements 604 labeled "H", and the server 106 can identify this relationship to relate ontology elements 402 across solution domains 702.

Through the use of immutable ontologies 602, the ontologies 122 contained in different solution domains 702 may be integrated. A model 750 of a solution domain and the mechanism for integrating the solution domain are shown in FIG. 7B. While the model 750 shown in FIG. 7B represents a single solution domain, multiple solution domains could be modeled in the same way.

As shown in FIG. 7B, the model 750 includes different application instance ontology spaces 752. Each application instance ontology space 752 represents an ontology 122 within a solution domain.

Each ontology 122 has an associated immutable ontology 602. Based on this, each application instance ontology space 752 is associated with an immutable ontology space 754. An immutable ontology space 754 contains an immutable ontology 602 that is associated with the ontology 122 contained in an application instance ontology space 752.

The model 750 further includes core connections 756. The core connections 756 connect various elements 604 in the immutable ontologies 602 contained in the immutable ontology spaces 754. The core connections 756 could, for example, represent the connections 706 shown in FIG. 7A. The core connections 756 connect the elements 604 in the various immutable ontologies 602, which allows the server 106 to navigate from one immutable ontology space 754 to other immutable ontology spaces 754. This also allows the server 106 to navigate from one application instance ontology space 752 to other application instance ontology spaces 752 through the immutable ontology spaces 754 and the core connections 756.

Collectively, the immutable ontology spaces 754 and the core connections 756 form an "immutable ontology core" in the model 750. This immutable ontology core may be replicated in each solution domain being integrated. Ontology elements 402 within a single solution domain may be related using the immutable ontology core. Moreover, since the immutable ontology core is the same in each solution domain, ontology elements 402 in different solution domains also may be related by relating elements in the immutable ontology core. In this way, the immutable ontology core can be used to transparently relate ontology elements 402 across solution domains.

As stated above, FIGS. 7A and 7B show how two solution domains 702 may be integrated using immutable ontologies 602 without extensions 606. In other cases, the solution domains 702 may have different immutable ontologies 602. For example, one or more of the immutable ontologies 602 may have different extensions 606. When establishing connections 706 between these different immutable ontologies 602, the elements 604 in the immutable ontologies 602 (such as the elements 604 in the extensions 606) may not match perfectly. In some embodiments, a user manually identifies relationships between the elements 604 in the immutable ontologies 602 as needed. In particular embodiments, the differences between the immutable ontologies 602 are easily determined, and in many cases the number of these differences is small. As a result, the burden on the user to manually map relationships between the elements 604 in the immutable ontologies 602 is small.

Although FIGS. 7A and 7B illustrate one example of an inter-relationship between two solution domains 702, various changes may be made to FIGS. 7A and 7B. For example, the number of solution domains 702 and the contents of those solution domains 702 are for illustration only. Any other or additional solution domains may be integrated.

Figure 8:
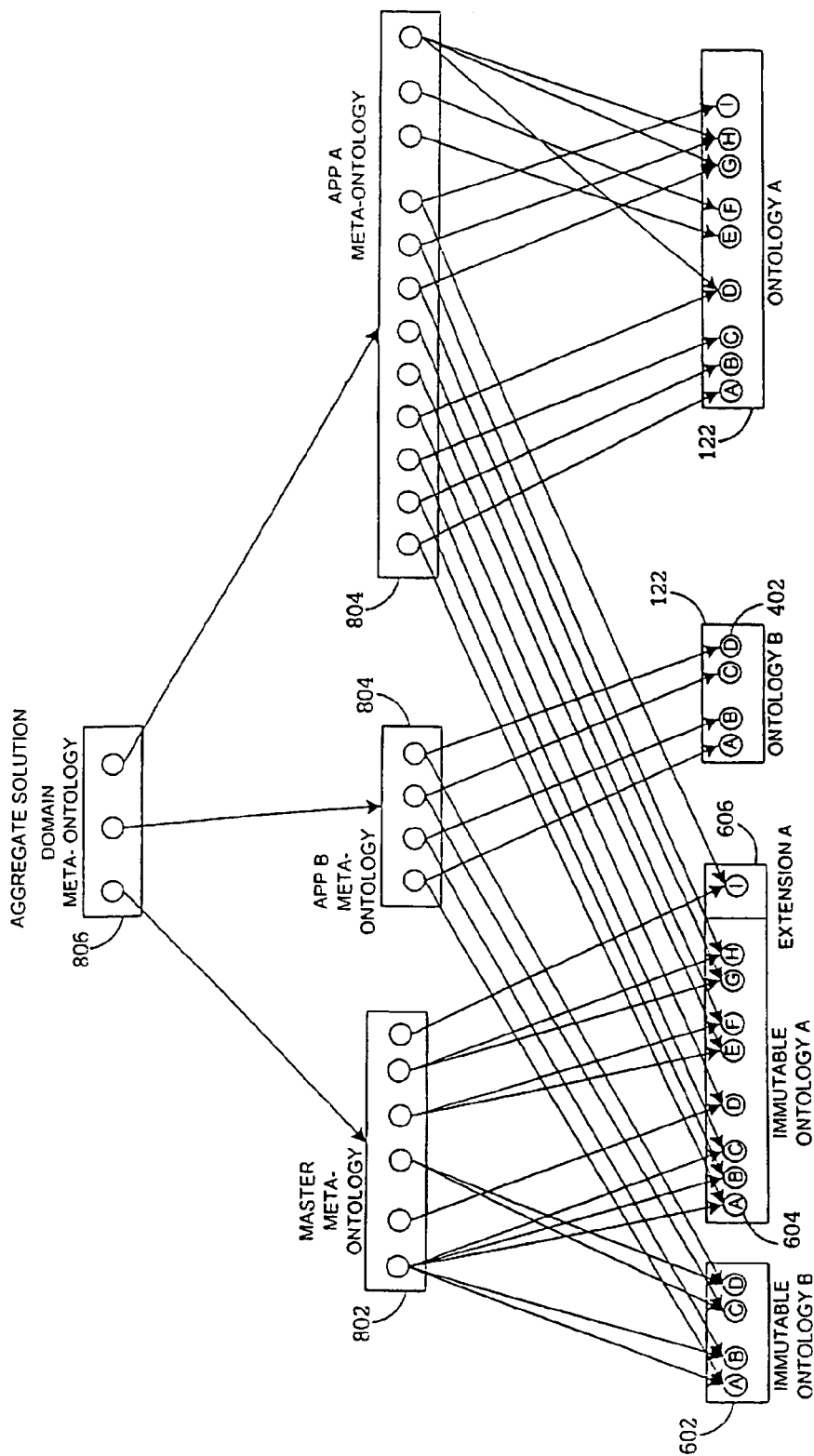
FIG. 8 illustrates an example relationship between meta-ontologies to produce a metalayer according to one embodiment of this disclosure.

FIG. 8 illustrates an example relationship between meta-ontologies to produce a metalayer according to one embodiment of this disclosure. In particular, FIG. 8 illustrates the relationships between two applications in a computing system 102. The integration shown in FIG. 8 is for illustration only. Other metalayers may be produced without departing from the scope of this disclosure.

As described above, in some embodiments, an immutable ontology 602 cannot be changed. In other embodiments, changes to an immutable ontology 602 may occur. Because the altered immutable ontology 602 forms part of the immutable ontology core in the model 750 and the immutable ontology core is replicated in different solution domains, the altered immutable ontology 602 may be updated in all solution domains. Also, a single ontology 122 or set of ontologies 122 may form part of multiple solution domains. This may occur, for example, when solution domains are merged to create another solution domain (a super domain) as shown in FIG. 2C. As another example, a solution domain may be partitioned as shown in FIG. 2B. If the elements 402 or the relationships for the single ontology 122 or set of ontologies 122 change, these changes may be reflected or updated in multiple solution domains.

To support this updating process, different types of meta-ontologies 124 could be supported in the system 100. In particular, the system 100 could support a master meta-ontology 802, an application meta-ontology 804, and an aggregate solution domain meta-ontology 806. The aggregate solution domain meta-ontology 806 represents the metalayer or meta meta-ontology 126 described above in FIG. 1.

Figure 9:
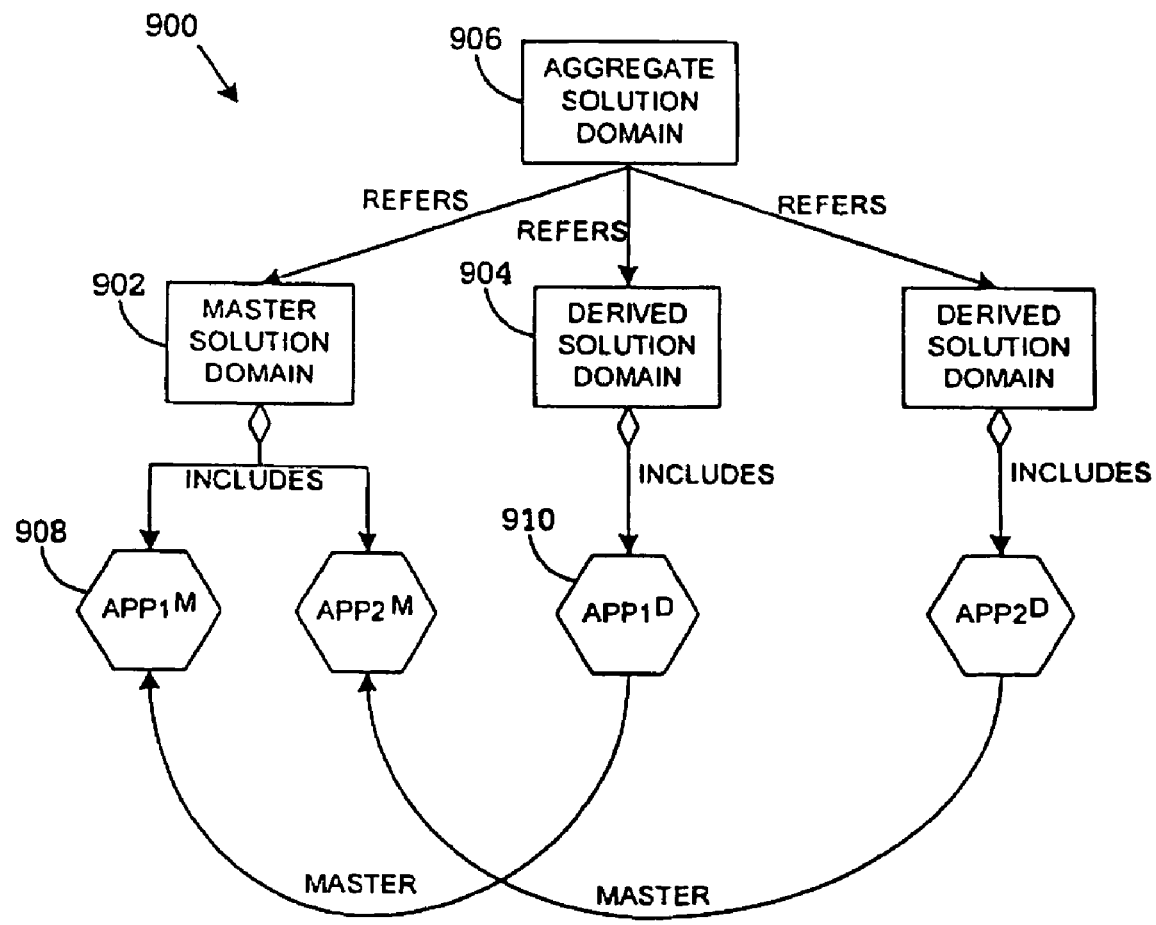
FIG. 9 illustrates an example hierarchy of solution domains according to one embodiment of this disclosure.

A master meta-ontology 802 identifies relationships between elements 604 in immutable ontologies 602. In some embodiments, a master meta-ontology 802 is associated with a master solution domain, which is shown in FIG. 9 and described below. In particular embodiments, a master meta-ontology 802 identifies relationships between immutable ontologies 602, where the immutable ontologies 602 include one immutable ontology 602 for each type of domain 110 included in the solution domain.

An application meta-ontology 804 describes the relationships between elements 402 in an ontology 122 and elements 604 in an immutable ontology 602. The ontology 122 associated with the application meta-ontology 804 may have one or more relationships that are not part of the master meta-ontology 802. For example, there may be additional relationships between elements 402 in the ontology 122, which are described in the application ontology 804. There may also be broken relationships between elements 402 in the ontology 122, so those elements 402 are not linked to their corresponding elements 604 in the immutable ontology 602. As shown in FIG. 8, the elements 402 labeled "E" and "F" in the ontology 122 labeled "Ontology A" are not linked to the corresponding elements 604 labeled "E" and "F" in the immutable ontology 602.

The aggregate solution domain meta-ontology 806 merges or combines the meta-ontologies 802-804 that describe the relationships for a solution domain. In particular, the aggregate solution domain meta-ontology 806 could be viewed as a meta meta-ontology that identifies the master meta-ontology 802 and all the application meta-ontologies 804 for each application within the solution domain. In particular embodiments, there is one set of immutable ontologies 602, and all meta-ontologies 802-804 point to the same elements 604 in the immutable ontologies 602. Also, in particular embodiments, there is one ontology 122 and one application meta-ontology 804 for an application, irrespective of the number of solution domains in which the application appears.

As shown in FIG. 8, an ontology 122 may include elements 402 that are not defined in the immutable ontology 602. To handle this situation, the master solution domain contains an immutable ontology 602 with an extension 606 to identify the new ontology elements 402. In this example, one immutable ontology 602 includes an extension 606 with an element 604 labeled "I". If the element 604 labeled "I" is related to another element, this relationship is defined within the master solution domain.

In particular embodiments, an aggregate solution domain meta-ontology 806 may span across multiple computing systems 102, which may be located at different geographical locations. When this occurs, the meta-ontologies 802-804 could connect to the ontologies 122 or the immutable ontologies 602 remotely. The master solution domain could also be duplicated at each remote location, where the master solution domains are synchronized periodically with each other.

Particular embodiments of the hierarchy of ontologies shown in FIG. 8 may support various advantages. For example, if there is a change in the relationships involving the elements 604 of the immutable ontologies 602, only the master solution domain relationships may need to change, and the change may be reflected automatically across the system. Also, if there is a change in an ontology 122, that ontology 122 and the corresponding meta-ontology 124 may be updated, and the update may be reflected automatically across the system. Further, the aggregate solution domain meta-ontology 806 determines the scope of each application solution domain, so tight security can be maintained with this approach. In addition, since most relationships are defined through the master solution domain, the entity that owns the master solution domain may wield enormous influence over the entire system.

Although FIG. 8 illustrates one example of relationships between meta-ontologies to produce a metalayer, various changes may be made to FIG. 8. For example, each of the ontologies 122, 802-806 could include any number of elements. Also, the aggregate solution domain meta-ontology 806 could integrate any number of application meta-ontologies 804.

FIG. 9 illustrates an example hierarchy 900 of solution domains according to one embodiment of this disclosure. In particular, FIG. 9 illustrates different types of solution domains that may be integrated using the technique described above with respect to FIG. 8. The hierarchy 900 of solution domains shown in FIG. 9 is for illustration only. Other hierarchies of solution domains may be used without departing from the scope of this disclosure.

The hierarchy 900 shown in FIG. 9 includes a master solution domain 902, one or more derived solution domains 904, and an aggregate solution domain 906. The master solution domain 902 contains one or more master applications 908. A master application 908 represents the standard implementation of an application in the computing systems 102. Each type of application may be represented by a master application 908. In particular embodiments, there may be one or more master solution domains 902, but a master application 908 resides in only one master solution domain 902. The master solution domain 902 may be used for application solving, such as when it is used by the solving engine 114 to define the boundaries for a solution to a user request. A master application 908 is associated with an immutable ontology 602.

A derived solution domain 904 contains a derived application 910. In some embodiments, the derived application 910 represents a clone of a master application 908 with some differences. In particular embodiments, the derived solution domain 904 contains only one derived application 910. A derived application 910 is associated with an application instance ontology 122.

An aggregate solution domain 906 represents a master solution domain 902 and one or more derived solution domains 904. In some embodiments, the aggregate solution domain 906 is used for application solving, where the boundary of the aggregate solution domain 906 includes all derived solution domains 904. In particular embodiments, the aggregate solution domain 906 is the only visible solution domain to users.

Although FIG. 9 illustrates one example of a hierarchy 900 of solution domains, various changes may be made to FIG. 9. For example, the hierarchy 900 could include any number of applications 908-910. The hierarchy 900 could also include any number of derived solution domains 904.

Figure 10:
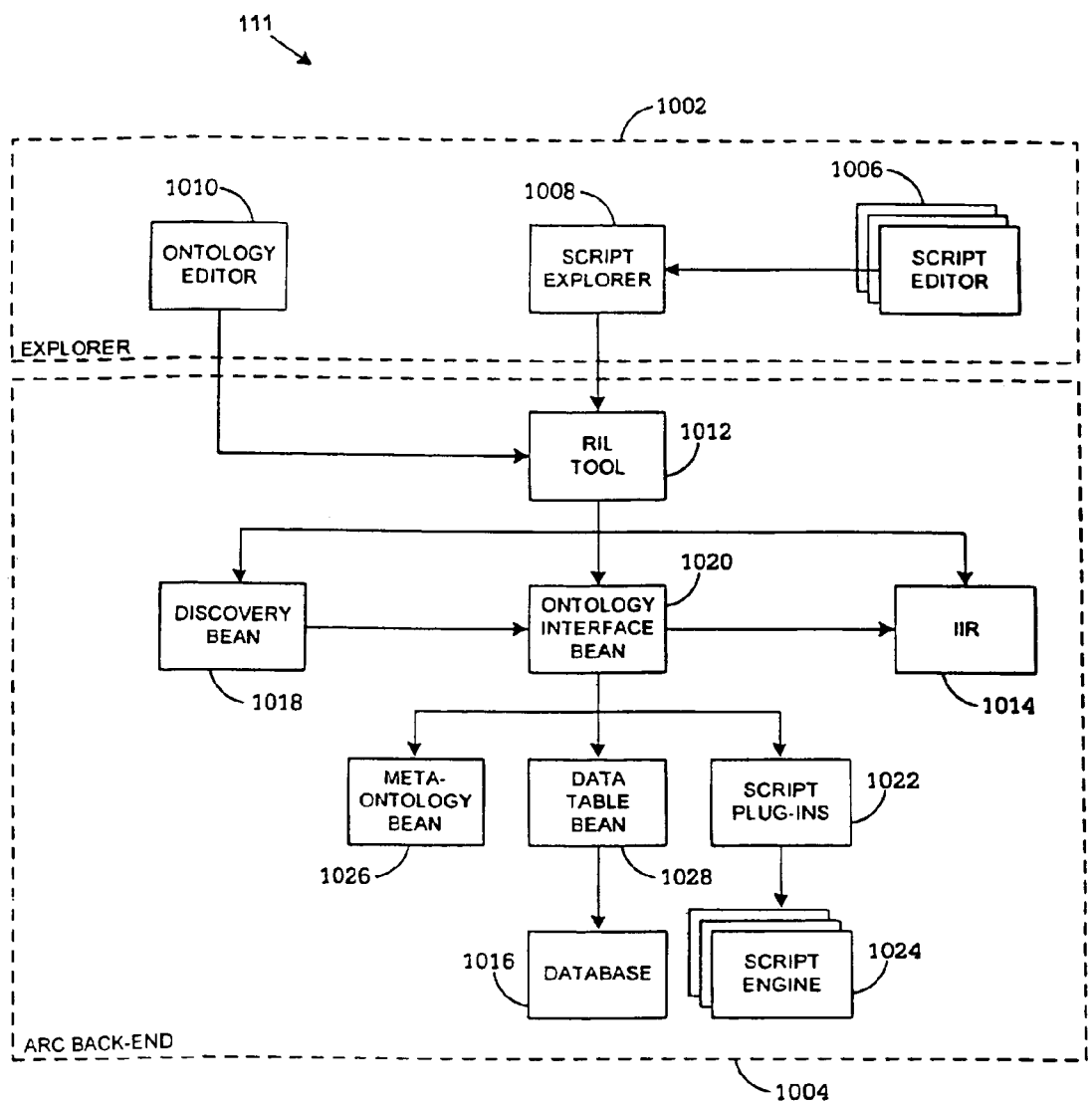
FIG. 10 illustrates an example ARC backend for relating computing systems according to one embodiment of this disclosure.

FIG. 10 illustrates an example ARC backend 111 for relating computing systems 102 according to one embodiment of this disclosure. The ARC backend 111 shown in FIG. 10 is for illustration only. Other embodiments of the ARC backend 111 may be used without departing from the scope of this disclosure.

As described above, the discovery engine 112 generates the ontologies and the ARC backend 111 generates the meta-ontologies used to inter-relate the computing systems 102. Also, to generate a meta-ontology, the ARC backend 111 may use rules to identify potential relationships between ontology elements 402 in the ontologies.

In some embodiments, at least some of the rules for identifying potential relationships between ontology elements 402 may be unable to identify the potential relationships with absolute certainty, and the user approves or disapproves the potential relationships. To facilitate the user's approval or disapproval of potential relationships, the ARC backend 111 shown in FIG. 10 implements an ontology relationship determination process. In this process, the ARC backend 111 identifies both a type of potential relationship and a confidence level for the identified potential relationship. The relationship type could identify any type of relationship, such as no relationship, an identical relationship, a transformational relationship, or undefined. The confidence level identifies the extent to which the identified potential relationship may be correct. The confidence level could represent any suitable value, such as a value between zero and ten where ten represents high confidence.

The confidence level of a potential relationship may be used in any number of ways. For example, the ARC backend 111 could automatically accept any potential relationship with a confidence level over a threshold. Also, users with higher privileges may be able to accept a potential relationship with a lower confidence level or reject a proposed relationship with a higher confidence level. The ARC backend 111 could further sort the potential relationships by confidence level. In addition, the user could ignore potential relationships with low confidence levels.

The ARC backend 111 shown in FIG. 10 supports this ontology relationship determination process. As shown in FIG. 10, the ARC backend 111 includes a front-end or explorer portion 1002 and a back-end portion 1004. In general, the explorer portion 1002 facilitates interaction with a user, while the back-end portion 1004 processes the information supplied by the user.

In this example embodiment, the ARC backend 111 allows a user to write rules for identifying potential relationships between ontology elements 402 using scripts. The use of scripts may allow the user to write complex rules that may be easily changed when needed. Other embodiments of the ARC backend 111 could also be used.

As shown in FIG. 10, the ARC backend 111 includes one or more script editors 1006. The script editors 1006 allow a user to create new scripts, edit existing scripts, or delete scripts. The script editors 1006 may represent any suitable mechanism for composing scripts. For example, a script editor 1006 could represent a simple text box. More advanced script editors 1006 could also be used. In particular embodiments, the script editors 1006 represent plug-ins capable of interfacing with other components in the ARC backend 111.

The script editors 1006 may support the use of any suitable scripting language or languages. For example, a script language may allow a script to be callable as a function from Java or other object-oriented language. The script language may also allow parameters, such as strings, to be passed to and received from a script. The script language may further allow a script to invoke other Java or object-oriented functions to handle complex processes. In addition, the script language may support strong string manipulation operations and be supported on different computing platforms. Example script languages include Perl, Python, and Ruby, although any other script language may be used.

The scripts could represent any suitable rules. In particular embodiments, each script acts as a function call. For example, a rule could act as the following function call:

String getRelationship(Type1, InstanceName1, Class1, EleName1, Type2, InstanceName2, Class2, EleName2)

where Type1 and Type2 represent the ontology type of two ontology elements 402, InstanceName1 and InstanceName2 represent the names of the two ontology elements 402, Class1 and Class2 represent the class names associated with the two instances of the ontology elements 402, and Elename1 and Elename2 represent the instance names of the two ontology elements 402.

Other or additional types of rules could also be used and supported in the ARC backend 111. For example, pattern-based rules could be used. As a particular example, the pattern-based rules could represent rules that heuristically determine a distance metric between the ontology elements 402. These metrics could be based on the ontology class names, the instance names, or other criteria. Smaller distance metrics may mean closer potential relationships, although closeness might only suggest a potential relationship and may not necessarily result in an actual relationship.

A script explorer 1008 allows the user to select scripts to be opened for addition, editing, or deletion. In some embodiments, the script explorer 1008 allows users with appropriate privileges to have read and write access to the scripts. The script explorer 1008 then interacts with the back-end portion 1004 to audit the scripts and to maintain the integrity of the scripts in a multi-user environment.

An ontology editor 1010 allows a user to maintain and edit the ontologies. For example, the ontology editor 1010 may allow the user to view and approve or disapprove of the potential relationships. The ontology editor 1010 may also allow a user to view ontology elements 402 with their associated relationships and to define or break relationships.

The ARC backend 111 processes the information supplied by a user to, among other things, generate meta-ontologies and meta meta-ontologies. In the illustrated example, the back-end portion 1004 includes a repository interface layer (RIL) tool 1012. The RIL tool 1012 supports the storage and retrieval of script-based rules and pattern-based rules to and from an internal interface repository (IIR) 1014. For example, the RIL tool 1012 may help to ensure that the storage of a script-based rule is performed with proper associations. The RIL tool 1012 may also help to ensure that only users with appropriate privileges have read or write access to the stored rules. In addition, the RIL tool 1012 may allow users to audit any updates to the stored rules. The IIR 1014 represents any suitable storage for storing and facilitating retrieval of script-based and pattern-based rules. The IIR 1014 could, for example, represent the repository 108 shown in FIG. 1.

Additional rules may be stored in a database 1016. As a user approves or disapproves of potential relationships, information about these approvals or disapprovals is stored as rules in the database 1016. For example, assume that a single script-based rule is configured to represent the following natural language statement: "If two ontology element instance names have three or more common consonants, these two ontology elements are related. The confidence level is computed as f(<number of common letters>/<total letters>)." During the discovery process, the following potential relationships are identified:

| | | |
|---|---|---|
| CustomerName | ←→ | CustName |
| CustomerNumber | ←→ | CustNum |
| Zip | ←→ | ZipCode |
| SalesCode | ←→ | SalesZone |

The user examines these potential relationships and accepts the first three and rejects the last one. Four entries defining new rules may then be added in a table in the database 1016 as follows:

| | | |
|---|---|---|
| CustomerName | CustName | Related |
| CustomerNumber | CustNum | Related |
| Zip | ZipCode | Related |
| SalesCode | SalesZone | Not Related |

Each of these entries now represents a rule that can be used to accept or reject additional potential relationships. Each rule contained in the database 1016 may be referred to as a "databased rule." The databased rules thus represent a knowledge base collected over time. During the rediscovery processes, the databased rules may be applied first. If none of the databased rules applies, script-based or pattern-based rules stored in the IIR 1014 may be applied.

In some embodiments, the databased rules are stored in relational database tables. In particular embodiments, many different types of databased rules may be defined, and each of these types may use different tables. As a particular example, the most generic databased rule may use a table with following schema:
Application Type 1
Application Instance Name 1
Ontology Element Class Name 1
Ontology Element Instance Name 1
Application Type 2
Application Instance Name 2
Ontology Element Class Name 2
Ontology Element Instance Name 2
Relationship
Confidence Level.

Database tables may be created before or during the automated discovery process and be maintained for use during the rediscovery process performed by the discovery engine 112. Entries in the tables may be added because of the user approving or disapproving of potential relationships between ontology elements 402 during the discovery or rediscovery process. As the user approves or disapproves the potential relationships, the relationship data is captured into the database tables. This data is used during the rediscovery process to compute relationships with more confidence. Over time, the information in the database tables may even be used to automatically determine relationships accurately. The database 1016 may represent any suitable storage medium or a portion of a storage medium, such as a portion of the repository 108.

The various rules in the IIR 1014 and the database 1016 may vary in scope. For example, a rule could apply to a specific ontology, ontologies associated with a particular type of application, or all ontologies. In particular embodiments, a rule that applies to a specific ontology or to a particular type of application may result in higher confidence levels. Rules that apply to all ontologies often represent pattern-based rules that result in lower confidence levels, although as databased rules are defined the confidence levels typically become higher.

A discovery bean 1018 facilitates communication with applications in computing systems 102. The discovery bean 1018 also facilitates the discovery of the ontology elements 402 associated with the application. When the ontology elements 402 are identified, the discovery bean 1018 invokes the addition of a new or updated application instance ontology and a new or updated meta-ontology.

An ontology interface bean 1020 facilitates the creation and maintenance of ontologies in the system 100. For example, the ontology interface bean 1020 may add a new or updated ontology to the IIR 1014 or other location. The ontology interface bean 1020 could also identify relationships between ontology elements 402 within the new or updated ontology and between multiple ontologies by applying script-based, databased, and pattern-based rules. The ontology interface bean 1020 may further approve or disapprove of the potential relationships, such as by allowing a user to select valid relationships. Beyond that, the ontology interface bean 1020 could retrieve all ontology elements 402 within an ontology, add relationships between ontology elements 402, and break relationships between ontology elements 402. In addition, the ontology interface bean 1020 may retrieve script-based rules, set script-based rules, get databased rules, and set databased rules. The ontology editor 1010 may communicate with the ontology interface bean 1020 to support the operations of the ontology editor 1010.

In some embodiments, the ontology interface bean 1020 identifies potential relationships between ontology elements 402 using one or more script plug-ins 1022 and one or more script engines 1024. The script plug-ins 1022 provide a universal interface to the various script engines 1024. The script engines 1024 support the scripting languages used by users to create scripts. For example, the script engines 1024 may be used by the ontology interface bean 1020 to execute the script-based rules in the IIR 1014. To identify potential relationships between ontology elements 402, the rules may be executed in any suitable order. For example, in particular embodiments, databased rules associated with a particular ontology 122 and then script-based rules associated with a particular ontology 122 are executed first. Next, databased rules associated with a particular application type and then the script-based rules associated with a particular application type are executed. After that, databased rules, then script-based rules, and then pattern-based rules associated with all ontologies 122 are executed.

A meta-ontology bean 1026 facilitates the generation of meta-ontologies. One technique for generating meta-ontologies is described above. A data table bean 1028 facilitates the generation, storage, and retrieval of databased rules in tables in the database 1016.

Although FIG. 10 illustrates one example of a ARC backend 111 for relating computing systems 102, various changes may be made to FIG. 10. For example, the functional division shown in FIG. 10 is for illustration only. Various components of the ARC backend 111 may be combined or omitted and additional components may be added according to particular needs. Also, other embodiments of the ARC backend 111 may be used in the system 100 of FIG. 1.

Figure 11:
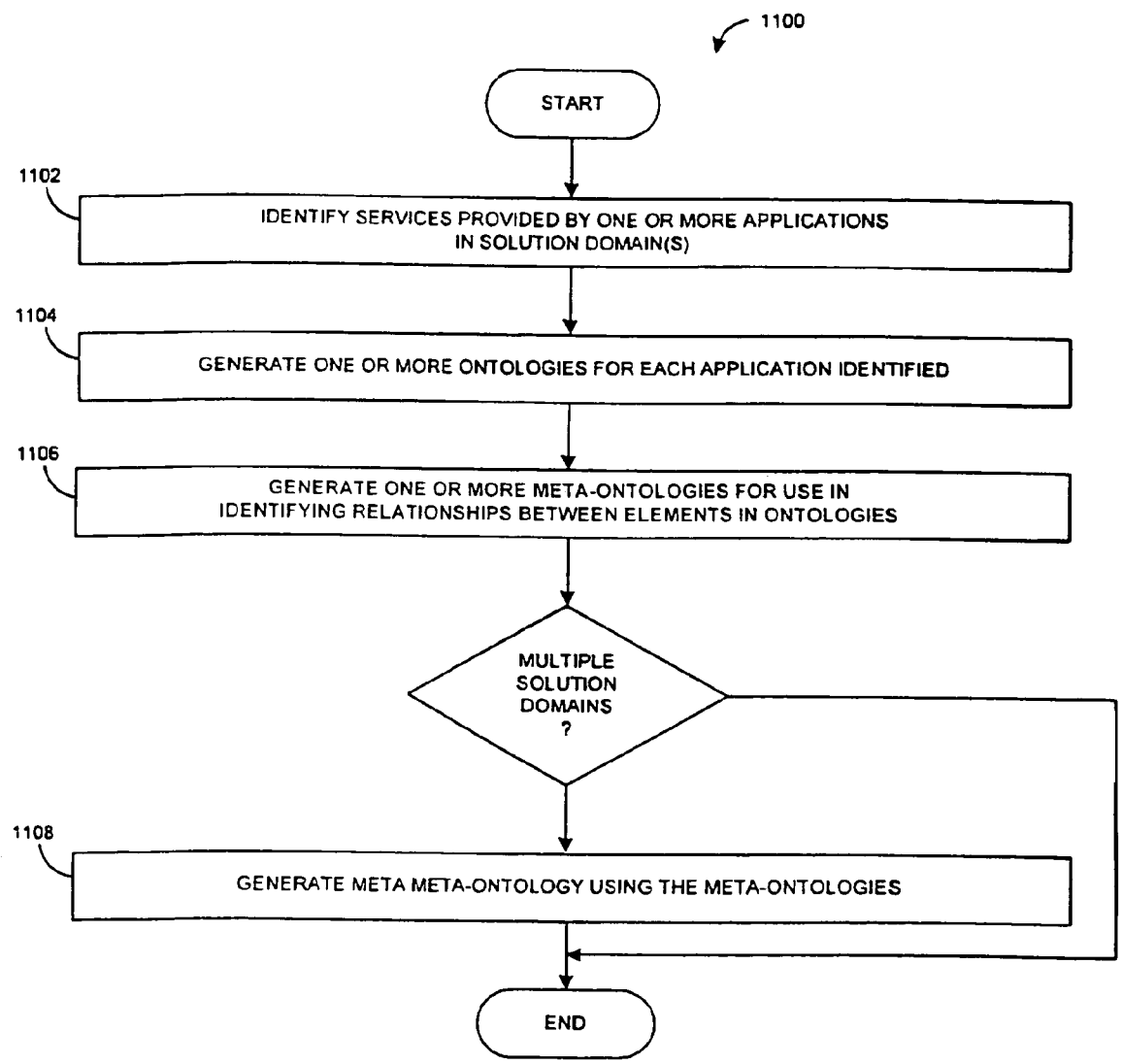
FIG. 11 illustrates an example method for relating one or more computing systems according to one embodiment of this disclosure.

FIG. 11 illustrates an example method 1100 for relating one or more computing systems 102 according to one embodiment of this disclosure. For ease of explanation, the method 1100 is described with respect to the server 106 operating in the system 100 of FIG. 1. The method 1100 may be used by any other device and in any other system.

The semantic integration server 106 identifies services provided by one or more applications in one or more solution domains, block 1102. This may include, for example, the discovery engine 112 identifying one or more application servers in the computing system(s) 102 and identifying the applications provided by the application servers.

The semantic integration server 106 generates one or more ontologies for each identified application, block 1104. This may include, for example, the discovery engine 112 generating an ontology 122 for each identified application. This may also include the discovery engine 112 generating an immutable ontology 602 for each ontology 122.

The semantic integration server 106 generates one or more meta-ontologies for use in identifying relationships between ontology elements, block 1106. This may include, for example, the ARC backend 111 generating a meta-ontology 124 for the ontologies 122 and immutable ontologies 602 in a solution domain. This may also include the ARC backend 111 generating a master meta-ontology 802 and one or more application meta-ontologies 804 for the ontologies 122 and immutable ontologies 602 in a solution domain.

If only one solution domain is being inter-related, the method 1100 ends. At this point, the meta-ontologies produced by the ARC backend 111 facilitates the identification of relationships between the applications and services within the solution domain.

Otherwise, multiple solution domains are being inter-related, and the semantic integration server 106 generates a meta meta-ontology using the meta-ontologies, block 1108. This may include, for example, the ARC backend 111 generating a meta meta-ontology 126 or an application solution domain meta-ontology 806. The meta meta-ontology may be produced in any suitable manner, such as by merging the meta-ontologies. Meta-ontologies may be merged by combining the contents of the meta-ontologies or by generating pointers that point to the various meta-ontologies. At this point, the meta-ontologies produced by the ARC backend 111 facilitates identifying the relationships between the applications and services within each solution domain, and the meta meta-ontology facilitates the identification of relationships between the applications and services in different solution domains.

Although FIG. 11 illustrates one example of a method 1100 for integrating one or more computing systems 102, various changes may be made to FIG. 11. For example, FIG. 11 shows the generation of ontologies, meta-ontologies, and meta meta-ontologies. This may occur, for example, during the discovery process executed by the discovery engine 112. During the rediscovery process, existing ontologies, meta-ontologies, and meta meta-ontologies could be updated, and new ontologies, meta-ontologies, and meta meta-ontologies may be produced.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for relating applications in a computing system, comprising:

generating a plurality of ontologies associated with the applications, each ontology comprising one or more ontology elements representing one, or more application components chosen from a list consisting of: application services and parameters for associated application services; and generating a meta-ontology associated with the plurality of ontologies, the meta-ontology comprising one or more meta-ontology elements for use in representing one or more relationships between ontology elements, wherein the meta-ontology relates applications in the computing system and wherein generating the meta-ontology comprises identifying potential relationships between ontology elements, the one or more relationships comprising one or more of the potential relationships.

2. The method of claim 1, wherein identifying the potential relationships comprises identifying the potential relationships using a plurality of rules.

3. The method of claim 2, wherein generating the meta-ontology further comprises allowing a user to approve of the potential relationships.

4. The method of claim 3 further comprising generating additional rules based on the user's approval of the potential relationships.

5. The method of claim 3, wherein the plurality of rules comprises at least one of script-based rules and pattern-based rules.

6. The method of claim 1, further comprising identifying confidence levels for the potential relationships, the confidence levels identifying an extent to which the potential relationships may be correct.

7. The method of claim 1, wherein each of the relationships comprises one of a relationship between ontology elements in one ontology and a relationship between ontology elements in different ontologies.

8. The method of claim 1, wherein:

one of the relationships between ontology elements comprises one of an identical relationship and a transformational relationship;

the identical relationship indicates that the ontology elements are associated with identical information; and the transformational relationship indicates that information associated with one of the ontology elements is transformable into information associated with another of the ontology elements.

9. The method of claim 8, further comprising:

identifying a transform function associated with ontology elements related by a transformational relationship; and generating a service definition document for a transform service, the transform service providing the transform function.

10. The method of claim 8, wherein:
each ontology element is associated with a class; and
each meta-ontology element represents one of:
  the same class as the classes associated with ontology elements related through an identical relationship; and
  a super class of the classes associated with ontology elements related through a transformational relationship.

11. The method of claim 1, wherein:
the computing system is associated with multiple solution domains;
generating the ontologies comprises generating an ontology and an immutable ontology for each of the applications;
generating the meta-ontology comprises generating a meta-ontology for each of the solution domains; and
wherein the immutable ontologies facilitate identification of relationships between ontology elements in different solution domains.

12. The method of claim 1, wherein:
generating the ontologies comprises generating Web Ontology Language (OWL) documents describing the ontologies; and
generating the meta-ontology comprises generating an OWL document describing the meta-ontology.

13. The method of claim 1, wherein:
each of the applications provides one or more services; and
each ontology element is associated with at least one of the services or an input parameter and an output parameter for at least one of the services.

14. The method of claim 13, wherein generating the ontologies comprises generating the ontologies using service definition documents describing the services provided by the applications.

15. A system for relating application in a computing system, comprising:
  a discovery engine operable to generate a plurality of ontologies associated with the applications, each ontology comprising one or more ontology elements representing one or more application components chosen from a list consisting of: application services and parameters for associated application services;
  an ARC backend operable to generate a meta-ontology associated with the plurality of ontologies, the meta-ontology comprising one or more meta-ontology elements representing one or more relationships between ontology elements, wherein the ARC backend is operable to generate the meta-ontology by identifying potential relationships between ontology elements, the one or more relationships comprising one or more of the potential relationships; and
  a repository operable to store the ontologies and the meta-ontologies, wherein the meta-ontology relates applications in the computing system.

16. The system of claim 15, wherein the ARC backend is further operable to generate the meta-ontology by:
allowing a user to approve of the potential relationships.

17. The system of claim 16, wherein:
the ARC backend is operable to identify the potential relationships using a plurality of rules; and
the rules comprise rules generated based on the user's previous approvals of potential relationships.

18. The system of claim 16, wherein the ARC backend is further operable to identify confidence levels for the potential relationships, the confidence levels identifying an extent to which the potential relationships may be correct.

19. The system of claim 15, wherein:
one of the relationships between ontology elements comprises one of an identical relationship and a transformational relationship;
the identical relationship indicates that the ontology elements are associated with identical information; and
the transformational relationship indicates that information associated with one of the ontology elements is transformable into information associated with another of the ontology elements.

20. The system of claim 19, wherein:
each ontology element is associated with a class; and
each meta-ontology element represents one of:
  the same class as the classes associated with ontology elements related through an identical relationship; and
  a super class of the classes associated with ontology elements related through a transformational relationship.

21. The system of claim 15, wherein:
the computing system is associated with multiple solution domains;
the discovery engine is operable to generate the ontologies by generating an ontology and an immutable ontology for each of the applications;
the ARC backend is operable to generate the meta-ontology by generating a meta-ontology for each of the solution domains; and
wherein the immutable ontologies facilitate identification of relationships between ontology elements in different solution domains.

22. A computer program embodied on a computer readable medium and operable to be executed by a processor, the computer program comprising computer readable program code for:
  generating a plurality of ontologies associated with a plurality of applications in a computing system, each ontology comprising one or more ontology elements representing one or more application components chosen from a list consisting of: application services and parameters for associated application services; and
  generating a meta-ontology associated with the plurality of ontologies, the meta-ontology comprising one or more meta-ontology elements representing one or more relationships between ontology elements wherein the computer readable program code for generating the meta-ontology comprises:
    computer readable program code for identifying potential relationships between ontology elements, the one or more relationships comprising one or more of the potential relationships.

23. The computer program of claim 22, wherein the computer readable program code for generating the meta-ontology further comprises:
computer readable program code for identifying confidence levels for the potential relationships, the confidence levels identifying an extent to which the potential relationships may be correct.

24. The computer program of claim 23, wherein the computer readable program code for generating the meta-ontology further comprises computer readable program code for allowing a user to approve of the potential relationships.

25. The computer program of claim 23, wherein the computer readable program code for identifying the potential relationships comprises computer readable program code for executing a plurality of rules.

26. The computer program of claim 25, wherein the rules comprise at least one of script-based rules, pattern-based rules, and rules based on a user's prior approval of potential relationships.

27. The computer program of claim 22, wherein:
one of the relationships between ontology elements comprises one of an identical relationship and a transformational relationship;
the identical relationship indicates that the ontology elements are associated with identical information; and
the transformational relationship indicates that information associated with one of the ontology elements is transformable into information associated with another of the ontology elements.

28. The computer program of claim 27, wherein:
each ontology element is associated with a class; and
each meta-ontology element represents one of:
the same class as the classes associated with ontology elements related through an identical relationship; and
a super class of the classes associated with ontology elements related through a transformational relationship.

29. The computer program of claim 22, wherein:
the computing system is associated with multiple solution domains;
the computer readable program code for generating the ontologies comprises computer readable program code for generating an ontology and an immutable ontology for each of the applications;
the computer readable program code for generating the meta-ontology comprises computer readable program code for generating a meta-ontology for each of the solution domains; and
wherein the immutable ontologies facilitate identification of relationships between ontology elements in different solution domains.

\* \* \* \* \*